(12) United States Patent
Kawase et al.

(10) Patent No.: US 8,052,527 B2
(45) Date of Patent: Nov. 8, 2011

(54) CALCULATION CONTROL METHOD, STORAGE MEDIUM, AND GAME DEVICE

(75) Inventors: Satoshi Kawase, Tokyo (JP); Toshiyuki Ishii, Saitama (JP)

(73) Assignee: Namco Bandai Games Inc., Tokyo (JP)

( * ) Notice: Subject to any disclaimer, the term of this patent is extended or adjusted under 35 U.S.C. 154(b) by 843 days.

(21) Appl. No.: 12/073,872

(22) Filed: Mar. 11, 2008

(65) Prior Publication Data
US 2008/0227543 A1 Sep. 18, 2008

(30) Foreign Application Priority Data
Mar. 14, 2007 (JP) ................................. 2007-065824

(51) Int. Cl.
*A63F 9/24* (2006.01)
(52) U.S. Cl. ......................................................... 463/31
(58) Field of Classification Search ...................... 463/31
See application file for complete search history.

(56) References Cited

U.S. PATENT DOCUMENTS

| | | | |
|---|---|---|---|
| 2005/0192071 A1* | 9/2005 | Matsuno et al. | 463/1 |
| 2008/0119279 A1* | 5/2008 | Nogami et al. | 463/42 |
| 2009/0048009 A1* | 2/2009 | Brekelmans et al. | 463/4 |
| 2010/0069156 A1* | 3/2010 | Riego | 463/42 |
| 2010/0273544 A1* | 10/2010 | Koganezawa et al. | 463/2 |
| 2010/0292011 A1* | 11/2010 | Kira et al. | 463/43 |

FOREIGN PATENT DOCUMENTS

JP   A 2005-224281   8/2005

* cited by examiner

*Primary Examiner* — Pierre E Elisca
(74) *Attorney, Agent, or Firm* — Oliff & Berridge, PLC

(57) ABSTRACT

A plurality of first missions (mission A (M 1A), mission B (M1B), and mission C (M1C)) are set corresponding to different battle areas in a game space 2. The operations of NPCs are automatically controlled so that friend NPCs 8 and enemy NPCs 9 involved in each first mission simultaneously fight a battle in parallel. A player character 6 is automatically determined to have participated in the first mission for which the player character 6 has approached the battle area or the first mission in which the enemy NPC 9 which has been shot down by the player character 6 is involved, and individual mission support contribution points Pa, Pb, Pc, and total support contribution points Pt are increased when the player character 6 has shot down the enemy NPC 9. When the player has performed a support request operation input, the total support contribution points Pt are decreased by given points. A support character 8s is selected from surviving friend NPCs 8a and 8b involved in the first missions which have been accomplished. The support character 8s is controlled to approach the present position of the player character 6 and support the player character 6 corresponding to the type of support request.

19 Claims, 22 Drawing Sheets

FIG. 6

| | DISPLAY TARGET MISSION SETTING | |
|---|---|---|
| | MISSION TYPE | DISPLAY TARGET FLAG |
| | ALL MISSIONS | 1 |
| | MISSION A | 0 |
| | MISSION B | 0 |
| | MISSION C | 0 |

536 — (table box)
536a — MISSION TYPE
536b — DISPLAY TARGET FLAG

FIG. 11

| | 550 |
|---|---|
| | SUCCESS MISSION FLAG |

| MISSION TYPE | SUCCESS FLAG |
|---|---|
| MISSION A | 1 |
| MISSION B | 0 |
| MISSION C | 0 |

550a — MISSION TYPE column
550b — SUCCESS FLAG column

FIG. 12

| 552 CHARACTER STATUS DATA | | | | | | | | | |
|---|---|---|---|---|---|---|---|---|---|
| 552a | 552b | 552c | 552d | CAPABILITY PARAMETER VALUE 552h | | 552i | 552j | 552k | 552m |
| CHARACTER IDENTIFI- CATION INFORMATION | INVOLVED MISSION | PRESENT POSITION COORDINATE | SPEED | MAXIMUM SPEED | DURABILITY VALUE | ... | SUPPORT CHARACTER FLAG | SUPPORT REQUEST TYPE | FINISH CONDITION IDENTIFI- CATION INFORMATION | ATTACK TARGET CHARACTER IDENTIFICATION INFORMATION |
| FRIEND1 | M1A | (Xf1,Yf1,Zf1) | V1 | V1 | 100 | ... | 0 | NULL | NULL | NULL |
| FRIEND2 | M1A | (Xf2,Yf2,Zf2) | V2 | V2 | 0 | ... | 0 | NULL | NULL | NULL |
| FRIEND3 | M1B | (Xf3,Yf3,Zf3) | V3 | V3 | 120 | ... | 1 | ATTACK | EC1 | ENEMY10 |
| ... | ... | ... | ... | ... | ... | ... | ... | ... | ... | ... |

FIG. 13

554 FINISH CONDITION SETTING DATA

| POINT RANGE 554a | FINISH CONDITION IDENTIFICATION INFORMATION 554b | FINISH CONDITION OPTION 554c |
|---|---|---|
| 0~50 | EC1 | (1) 30 SECONDS HAVE ELAPSED AFTER SUPPORT OPERATION HAS STARTED, (2) NUMBER OF AIRCRAFT WHICH HAVE BEEN SHOT DOWN = 1, (3) ⋯ |
| 51~100 | EC2 | (1) 60 SECONDS HAVE ELAPSED AFTER SUPPORT OPERATION HAS STARTED, (2) NUMBER OF AIRCRAFT WHICH HAVE BEEN SHOT DOWN = 2, (3) ⋯ |
| 101~200 | EC3 | (1) 120 SECONDS HAVE ELAPSED AFTER SUPPORT OPERATION HAS STARTED, (2) NUMBER OF AIRCRAFT WHICH HAVE BEEN SHOT DOWN = 4, (3) ⋯ |
| ⋮ | ⋮ | ⋮ |

FIG. 14

558 SUPPORT CHARACTER COUNT CALCULATION TBL

| POINT RANGE 558a | SUPPORT CHARACTER COUNT 558b |
|---|---|
| 0~50 | 1 |
| 51~100 | 20 % OF NUMBER OF AVAILABLE FRIEND NPCs |
| 101~200 | 50 % OF NUMBER OF AVAILABLE FRIEND NPCs |
| ⋮ | ⋮ |

CALCULATION CONTROL METHOD, STORAGE MEDIUM, AND GAME DEVICE

Japanese Patent Application No. 2007-65824 filed on Mar. 14, 2007, is hereby incorporated by reference in its entirety.

BACKGROUND OF THE INVENTION

A game classified as a combat flight simulation has been known in which the player operates an aircraft such as a fighter aircraft and attacks an enemy. The player enjoys the game by operating a fighter aircraft (i.e., player character) as a mercenary pilot or a regular force pilot, and attacking an enemy aircraft or an enemy ground weapon to accomplish operations assigned to the player.

In recent years, technology has been known in which a fighter aircraft (player character) operated by the player and a plurality of friend aircraft automatically controlled by a computer organize a military force, and the player plays the game while issuing instructions to the friend aircraft (see JP-A-2005-224281, for example). Specifically, the friend aircraft are normally controlled to be distributed in a game space and to search for and attack an enemy. When the player has performed a gather instruction operation input, the friend aircraft are controlled to gather around the player character. When the player has performed an attack instruction operation input, the friend aircraft are controlled to selectively search for and attack an enemy within an attack range in front of the player character. Specifically, the player can not only enjoy a fighter aircraft flight simulation, but also enjoy a realistic situation in which the player fights a battle while receiving support from the friend aircraft.

In order to make the combat flight simulation game more realistic, it is desirable to employ large-scale military operations in which a number of weapons deployed over a wide area participate. It is also desirable that the player fight a battle while cooperating with friend characters instead of taking independent action in the operation area.

The technology disclosed in JP-A-2005-224281 may be applied to a number of friend non-player characters (NPCs) deployed over a wide area so that the player can cooperate with friend characters. According to the technology disclosed in JP-A-2005-224281, the friend aircraft operate based on instructions from the player. Therefore, a situation in which the player and the friend aircraft help each other in a battlefield cannot be implemented.

SUMMARY

According to one aspect of the invention, there is provided a calculation control method that causes a computer to execute a given video game by creating a virtual game space and controlling a character in the virtual game space, the method comprising:

disposing a plurality of non-player characters (hereinafter referred to as "NPCs") in respective battle areas in the game space, and causing the plurality of NPCs to fight a battle in parallel in the respective battle areas, the plurality of NPCs being classified into a friend NPC that fights with a player character (hereinafter referred to as "PC") and an enemy NPC that fights against the PC;

determining whether or not the PC has participated in the battle in the respective battle areas based on at least a present position of the PC;

detecting whether or not the player has performed a support request operation input;

performing a given support process, the given support process being a control process that causes a friend NPC involved in a battle area where the PC has been determined to participate in the battle to approach the present position of the PC and support the PC when detecting that the player has performed the support request operation input; and generating an image of the game space and controlling display of the generated image.

BRIEF DESCRIPTION OF THE SEVERAL VIEWS OF THE DRAWING

FIG. 6 is a data configuration diagram showing a data configuration example of a display target mission setting.

FIG. 11 is a data configuration diagram showing a configuration example of a success mission flag.

FIG. 12 is a data configuration diagram showing a data configuration example of character status data.

FIG. 13 is a data configuration diagram showing a configuration example of finish condition setting data.

FIG. 14 is a data configuration diagram showing a configuration example of a support character count calculation TBL.

DETAILED DESCRIPTION OF THE EMBODIMENT

Figure 1:
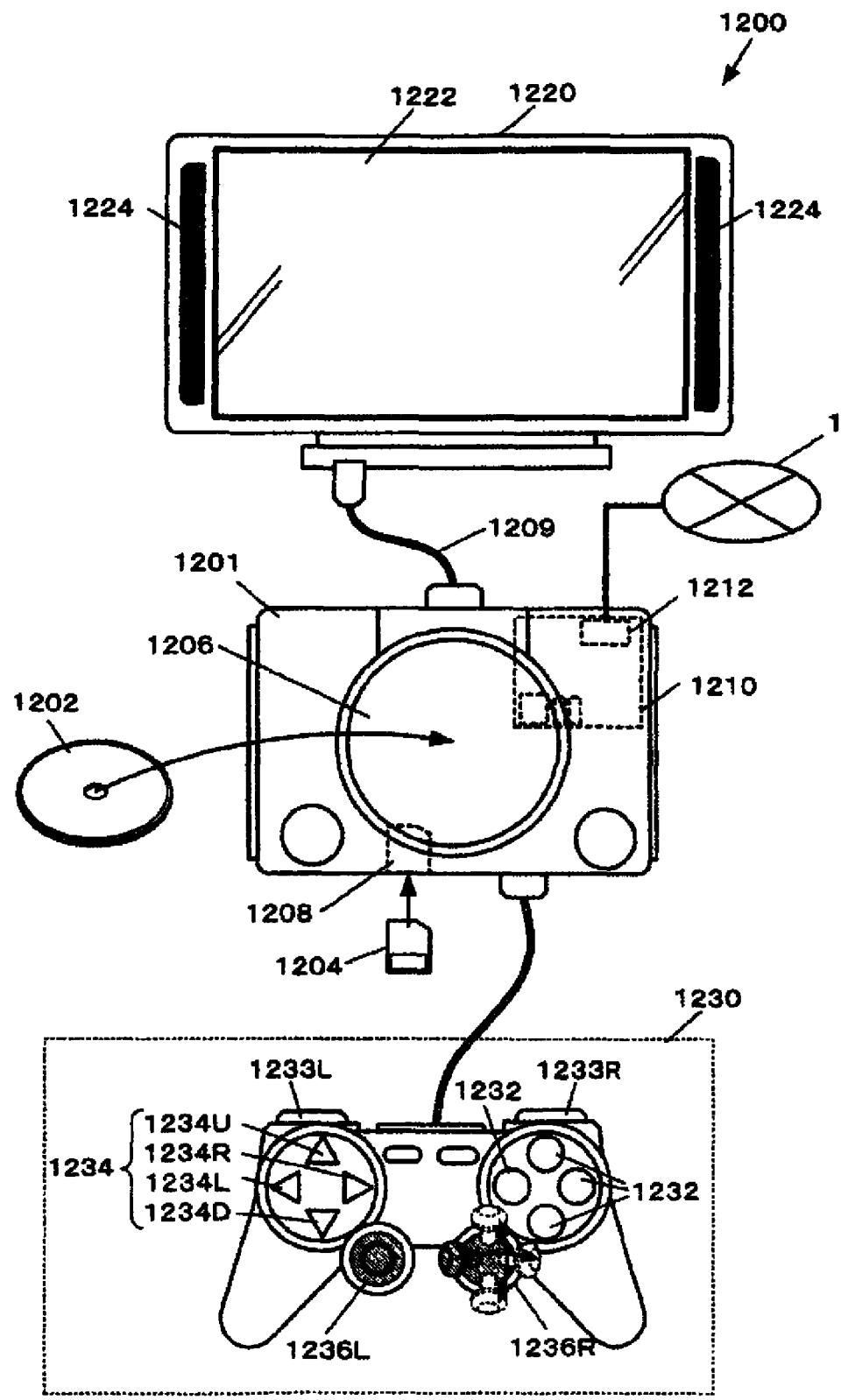
FIG. 1 is a system configuration diagram showing a configuration example of a consumer game device.

The invention may provide a calculation control method, a storage medium, and a game device which implement a situation in which characters help one another in a game in which a number of weapons (or soldiers) deployed over a wide area participate in large-scale operations.

determining whether or not the PC has participated in the battle in the respective battle areas based on at least a present position of the PC;

According to one embodiment of the invention, there is provided a calculation control method that causes a computer to execute a given video game by creating a virtual game space and controlling a character in the virtual game space, the method comprising:

disposing a plurality of non-player characters (hereinafter referred to as "NPCs") in respective battle areas in the game space, and causing the plurality of NPCs to fight a battle in parallel in the respective battle areas, the plurality of NPCs being classified into a friend NPC that fights with a player character (hereinafter referred to as "PC") and an enemy NPC that fights against the PC;

determining whether or not the PC has participated in the battle in the respective battle areas based on at least a present position of the PC;

detecting whether or not the player has performed a support request operation input;

performing a given support process, the given support process being a control process that causes a friend NPC involved in a battle area where the PC has been determined to participate in the battle to approach the present position of the PC and support the PC when detecting that the player has performed the support request operation input; and generating an image of the game space and controlling display of the generated image.

According to another embodiment of the invention, there is provided a computer-readable storage medium storing a program that causes a computer to execute a given video game by creating a virtual game space and controlling a character in the virtual game space, the program causing the computer to:

dispose a plurality of non-player characters (hereinafter referred to as "NPCs") in respective battle areas in the game space, and cause the plurality of NPCs to fight a battle in parallel in the respective battle areas, the plurality of NPCs being classified into a friend NPC that fights with a player character (hereinafter referred to as "PC") and an enemy NPC that fights against the PC;

determine whether or not the PC has participated in the battle in the respective battle areas based on at least a present position of the PC;

detect whether or not the player has performed a support request operation input;

perform a given support process, the given support process being a control process that causes a friend NPC involved in a battle area where the PC has been determined to participate in the battle to approach the present position of the PC and support the PC when detecting that the player has performed the support request operation input; and generate an image of the game space and controlling display of the generated image.

According to another embodiment of the invention, there is provided a game device that executes a given video game by creating a virtual game space and controlling a character in the virtual game space, the game device comprising:

a battle parallel execution section that disposes a plurality of NPCs in respective battle areas in the game space, and causes the plurality of NPCs to fight a battle in parallel in the respective battle areas, the plurality of NPCs being classified into a friend NPC that fights with a PC and an enemy NPC that fights against the PC;

a battle participation determination section that determines whether or not the PC has participated in a battle in plurality respective battle areas based on at least a present position of the PC;

a support request detection section that detects whether or not the player has performed a support request operation input; and a support process control section that performs a given support process, the given support process being a control process that causes a friend NPC in a battle area where the battle participation determination section has determined that the PC has participated in the battle to approach the present position of the PC and support the PC when the support request detection section has detected that the player has performed the support request operation input.

According to the above configuration, a battle state can be created in which the friend NPCs and the enemy NPCs individually fight against one another in a plurality of battle areas in the game space, and whether or not the player character has participated in each battle area can be determined. When the player has performed the support request operation input, the friend NPC which has fought in the battle area in which the player character has been determined to participate is automatically controlled to approach and support the player character.

Therefore, a game cane be implemented which allows the player to enjoy a situation in which characters help one another in a battlefield in a game in which a number of weapons (or soldiers) deployed over a wide area participate in large-scale operations.

In the calculation control method according to this embodiment, the calculation control method may further include:

determining whether or not the battle has been completed in the respective battle areas; and performing the support process for a friend NPC involved in a battle area where the PC has been determined to participate in the battle and the battle has been determined to have been completed.

According to the above configuration, the friend NPC which has been supported by the PC and has fought in the battle area in which the battle has been determined to have been completed can be controlled to respond to the support request.

In the calculation control method according to this embodiment, the calculation control method may further include: managing attack results for the PC corresponding to each battle area where the PC has been determined to participate in the battle; and selecting a friend NPC as a target of the support process based on the attack results corresponding to each battle area.

According to the above configuration, the attack results for the player character can be managed corresponding to each battle area. When selecting the friend NPC as the target of the support process, the friend NPC can be selected based on the attack results. Specifically, since the friend NPC as the target of the support process is selected corresponding to the results for the player character corresponding to each battle area, the game can be provided with variety.

Regarding selection of the friend NPC as the target of the support process, the player character can receive more effective support as the results increase by selecting the friend NPCs in a larger number and/or selecting a stronger friend NPC as the attack results become higher. Specifically, a situation in which the player character can receive more effective support from the friend NPC by supporting the friend NPC to a larger extent can be implemented, whereby the reality of the game can be improved.

In the calculation control method according to this embodiment, the calculation control method may further include selecting a battle area from the battle areas based on the attack results corresponding to the respective battle area, and selecting a friend NPC involved in the selected battle area as the target of the support process.

According to the above configuration, a battle area can be selected based on the attack results for the player character corresponding to each battle area, and the friend NPC involved in the selected battle area can be selected as the target of the support process. For example, if the friend NPC is selected with high probability from the battle area for which the player character has achieved higher attack results, the friend NPC corresponding to the battle area in which the player character has supported the friend NPC to a larger extent responds to the support request. Specifically, a situation in which the player character can receive more effective support from the friend NPC by supporting the friend NPC to a larger extent can be implemented, whereby a feel of cooperation and mutual help in the game can be enhanced.

In the calculation control method according to this embodiment, the calculation control method may further include selecting a battle area from the battle areas based on a selection operation performed by the player, and selecting a friend NPC involved in the selected battle area as a target of the support process.

According to the above configuration, the player can select the battle area from which the friend NPC as the target of the support process is selected. For example, when different types of friend NPCs are set corresponding to each battle area, the player can indirectly select the type of friend NPC as the target of the support process. Specifically, when the player can select a battle area in which infantrymen fight a battle and a battle area in which fighter aircraft fight a battle, for example, it is advantageous for the player to select the latter battle area when the enemy NPC is an aircraft weapon. Therefore, game playability can be improved by providing the support request with strategic characteristics.

In the calculation control method according to this embodiment, the calculation control method may further include selecting a friend NPC as the target of the support process from friend NPCs involved in the selected battle area based on the attack results corresponding to the selected battle area.

According to the above configuration, the friend NPC as the target of the support process can be selected corresponding to the attack results for the player character during a battle. For example, if a larger number of friend NPCs are selected as the attack results become higher, or a friend NPC with higher offensive power and higher hit points (i.e., a friend NPC which is rarely shot down even if attacked during the support process) is selected as the attack results become higher, the player character can receive more advantageous support by supporting the friend NPC to a larger extent and achieving higher attack results. Therefore, a situation in which friends characters help one another in a battlefield can be implemented, whereby the reality and the playability of the game can be further improved.

In the calculation control method according to this embodiment, the calculation control method may further include:

terminating the support process when a given execution time has elapsed after the support process has been performed; and changing the control execution time based on the attack results corresponding to the selected battle area.

According to the above configuration, a support process execution time limit can be provided, and the time limit can be changed based on the attack results for the selected battle area. For example, if the control execution time is increased as the attack results become higher, the player character can receive more advantageous support by supporting the friend NPC to a larger extent and achieving higher attack results. Therefore, a situation in which friend characters help one another in a battlefield can be implemented, whereby the reality and the playability of the game can be further improved.

In the calculation control method according to this embodiment, the calculation control method may further include:

calculating and managing evaluation points determined by evaluating the attack results for the PC corresponding to each battle area using a given evaluation method as overall attack results for the PC corresponding to the battle areas;

subtracting given evaluation points from the evaluation points each time the support request operation input is detected; and when the support request operation input has been detected, omitting the support process when the evaluation points are less than the given evaluation points, and performing the support process when the evaluation points are equal to or greater than the given evaluation points.

According to the above configuration, the evaluation points can be accumulated as the attack results, and the evaluation points can be decreased by given points when executing the support process in response to the support request. When the evaluation points are less than the given points, support process control can be omitted. Therefore, since there may be a case where the player cannot send a request support, strategic characteristics can be provided (e.g., the player determines the timing at which the player sends a support request), whereby game playability can be improved. Moreover, since the number of times that a support request can be accepted increases by supporting the friend NPC to a larger extent and achieving higher results, a situation in which the player character can be supported more effectively by more effectively helping the friend NPC can be implemented in a game.

In the calculation control method according to this embodiment, the calculation control method may further include:

determining whether or not the battle has succeeded in the respective battle areas; and adding given bonus points to the evaluation points corresponding to each battle area where the PC has been determined to participate in the battle and the battle has been determined to have succeeded.

In the calculation control method according to this embodiment, the calculation control method may further include changing a given capability parameter value set corresponding to the selected friend NPC.

According to the above configuration, support provided by the friend NPC which has responded to the support request from the player can be changed by changing the capability of the friend NPC as the target of the support process. Therefore, effectiveness of the support request can be adjusted.

In the calculation control method according to this embodiment, the calculation control method may further include increasing the capability parameter value relating to a moving speed.

According to the above configuration, the friend NPC as the target of the support process can more quickly approach the player character. Therefore, a situation in which the friend NPC as the target of the support process does not appear for a long period of time even if the player has sent a support request can be prevented, whereby the player can quickly receive support.

In the calculation control method according to this embodiment, the calculation control method may further include:

detecting a type of support request input by the support request operation input; and performing the support process while changing an attack target of the friend NPC as a target of the support process based on the type of the support request that has been detected.

According to the above configuration, the type of support request can be input. The attack target of the friend NPC as the target of the support process can be changed based on the type of support request. Examples of the support request include an attack support request which requests the friend NPC to attack the enemy designated by the player, and a backup support request which requests the friend NPC to selectively attack the enemy NPC that aims at the player to help the player. Therefore, since the player can select the type of support request, the player can receive support from the friend NPC corresponding to the situation.

In the calculation control method according to this embodiment, the calculation control method may further include:

selecting one or all of the battles corresponding to the respective battle areas executed in parallel; and displaying relative positions of a friend NPC and a enemy NPC involved in the selected battle with respect to the PC by means of a radar display.

According to the above configuration, the friend NPCs and the enemy NPCs in one or all of the battle areas in the game space can be selectively displayed by means of a radar display. Therefore, even if the battle areas are relatively close to each other, the player can determine the entire battle state. Moreover, the player can easily identify the battle area in which the player desires to participate and selectively attack the enemy NPC in that battle area. This facilitates game play.

In the calculation control method according to this embodiment, the calculation control method may further include:

generating a game image of the game space viewed from the PC;

selecting one or all of the battles corresponding to the respective battle areas executed in parallel; and detecting a friend NPC and a enemy NPC involved in the selected battle from the plurality of NPCs included in the game image, and displaying a given identifier corresponding to the friend NPC and the enemy NPC detected in the game image.

According to the above configuration, a given identifier can be displayed in the game image corresponding to the friend NPCs and the enemy NPCs in one or all of the battle areas selected by the player. Therefore, the player can easily identify the battle area in which the player desires to participate and selectively attack the enemy NPC in that battle area, whereby game play is facilitated.

In the calculation control method according to this embodiment, the game may be a mission clear-type game; and the calculation control method may further include displaying a mission of the game for the player at a given timing after the battles have been executed.

According to the above configuration, a mission for clearing the game can be displayed for the player at a given timing after each of the battles has been executed. Specifically, it is possible to transition to the final stage of the game irrespective of the battle results for the battle area. Therefore, a situation in which an inexperienced player cannot proceed with the game can be prevented so that a game which is relatively convenient for an inexperienced player can be implemented.

Preferred embodiments of the invention are described in detail below with reference to the drawings.

The following embodiments illustrate specific preferred examples of the invention and are provided with various technologically preferred limitations. Note that the scope of the invention is not limited to the following embodiments unless otherwise indicated.

First Embodiment

A first embodiment to which the invention is applied is described below taking an example of executing a combat flight simulation game using a consumer game device. Note that a game to which this embodiment may be applied is not limited to a combat flight simulation game. This embodiment may be similarly applied to a game in which a number of combat characters (e.g., warriors, soldiers, tanks, or battleships) simultaneously participate in a battle in various areas in a battlefield. Configuration of game device FIG. 1 is a system configuration diagram illustrative of a configuration example of a consumer game device according to this embodiment. As shown in FIG. 1, a consumer game device 1200 includes a game device main body 1210, a game controller 1230, and a video monitor 1220.

The game device main body 1201 includes a control unit 1210 which includes a CPU, an image processing LSI, an IC memory, and the like, and readers 1206 and 1208 for information storage media such as an optical disk 1202 and a memory card 1204. The consumer game device 1200 executes a given video game by reading a game program and various types of setting data from the optical disk 1202 and the memory card 1204, and causing the control unit 1210 to execute various game calculations based on an operation input performed using a game controller 1230.

The control unit 1210 includes electrical/electronic devices such as various microprocessors such as a central processing unit (CPU), a graphics processing unit (GPU), and a digital signal processor (DSP), an application-specific integrated circuit (ASIC), and an IC memory, and controls each section of the consumer game device 1200. The control unit 1210 also includes a communication device 1212 which connects with a communication channel 1 (e.g., Internet, local area network (LAN), or wide area network (WAN)) and implements data communication with an external device.

The game controller 1230 includes push buttons 1232 provided on the upper surface of the game controller 1230 and used for selection, cancellation, timing input, and the like, push buttons 1233R and 1233L provided on the front right side and the front left side of the game controller 1230, arrow keys 1234 (up key 1234U, down key 1234D, right key 1234R, and left key 1234L) used to input an upward direction, a downward direction, a rightward direction, and a leftward direction, a right analog lever 1236R, and a left analog lever 1238L.

The right analog lever 1236R and the left analog lever 1238L are direction input devices which allow the player to simultaneously input two axial directions (i.e., upward/downward direction and rightward/leftward direction). The player normally holds the game controller 1230 with the right and left hands, and operates the game controller 1230 with the thumbs placed on the levers. The player can input an arbitrary direction including two axial components and an arbitrary amount of operation depending on the amount of tilt of the lever by operating the levers. Each analog lever can also be used as a push switch by pressing the lever in its axial direction from the neutral state in which an operation input is not performed.

In this embodiment, the player inputs an operation such as a missile launch or a strafe from a fighter aircraft (i.e., player character) or a change in attack target using the push button 1232, inputs an acceleration operation using the push button 1233R, and inputs a deceleration operation using the push button 1233L. The player operates the fighter aircraft by inputting the pitch (up/down) of the fighter aircraft by operating the left analog lever 1236L upward or downward, and inputting the roll and the yaw of the fighter aircraft by operating the left analog lever 1236L rightward or leftward.

In this embodiment, the player inputs a display target change operation relating to a radar display or a container display described later using the right key 1234R and the left key 1234L, and inputs different support requests for a friend NPC described later using the up key 1234U and the down key 1234D. An operation input signal corresponding to the operation input is transmitted to the game device main body 1201.

The control unit 1210 of the game device main body 1201 executes a video game while generating a game image and game sound based on a detection signal and the operation input signal received from the game controller 1230. The game image and the game sound generated by the control unit 1210 are output to a video monitor 1220 (display monitor) connected to the game device main body 1201 via a signal cable 1209. The video monitor 1220 includes a display 1222 which displays an image, and a speaker 1224 which outputs sound. The player plays the game while watching a game image displayed on the display 1222 and listening to game sound output from the speaker 1224.

Outline of Game

An outline of the combat flight simulation game according to this embodiment is described below with reference to FIGS. 2 to 4.

Figure 2:
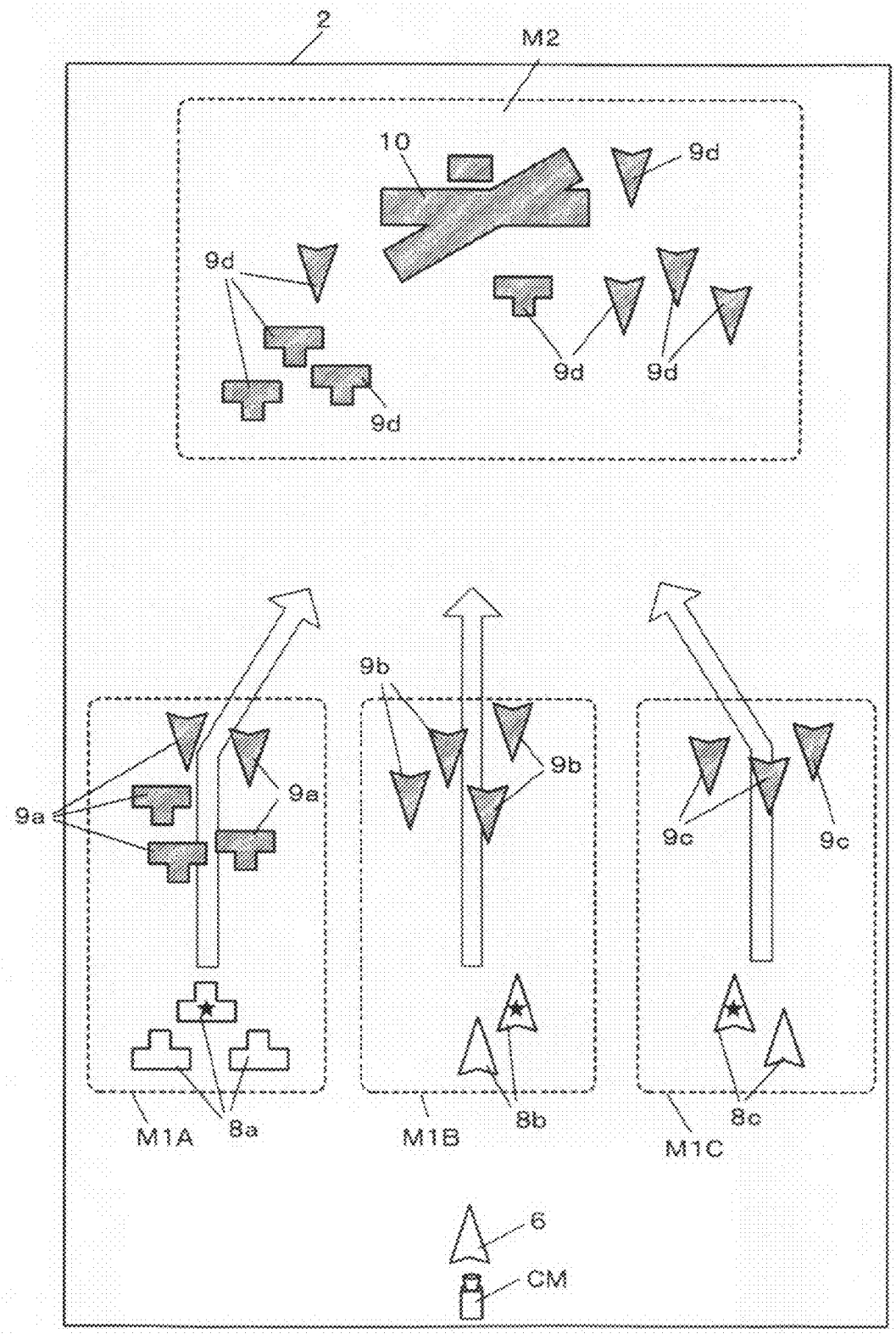
FIG. 2 is a schematic view illustrative of an outline of a combat flight simulation according to a first embodiment.

FIG. 2 is a schematic view illustrative of an outline of the combat flight simulation game according to this embodiment. FIG. 2 shows a state before the game starts. In this embodiment, a large game space 2 is formed in which three-dimensional objects (e.g., terrain, a tree, and a bridge) are disposed in a three-dimensional virtual space, as shown in FIG. 2. Three-dimensional objects of a player character (fighter aircraft) 6, a plurality of friend NPCs 8 (8a, 8b, and 8c), and a plurality of enemy NPCs 9 (9a, 9b, 9c, and 9d) are disposed in the game space 2. A game screen is generated based on an image photographed using a virtual camera CM controlled to follow the player character 6. Note that the virtual camera CM is omitted from other drawings.

The term "friend NPC 8" and the term "enemy NPC 9" refer to characters which participate in a battle and attack an enemy, such as a ground weapon (e.g., tank or anti-aircraft machine gun vehicle), an aircraft weapon (e.g., fighter aircraft, electronic warfare aircraft, or transport aircraft), a ship weapon (e.g., battleship, submarine, and boat), an infantryman, and an enemy position provided with a missile battery.

The combat flight simulation game according to this embodiment proceeds based on a story in which the player participates in one or more military operations. A single military operation includes a plurality of first missions (M1A, M1B, and M1C) performed in parallel in different areas within a game execution time, and a second mission (M2) which corresponds to the end objective of the military operation and is generated and performed after the first missions have been determined to be accomplished. The second mission can be performed when a second mission execution condition has been satisfied (e.g., a given period of time has elapsed after the first missions have been performed, or a given number of first missions have been cleared (accomplished)).

The second mission according to this embodiment is a sub-stage for clearing the game. The second mission is to destroy an enemy air station 10 positioned in the north of the game space 2 and the enemy NPCs 9 (9d) deployed around the enemy air station 10. The player wins (clears) the game when the second mission has been accomplished. On the other hand, the player loses the game when the player character 6 has been shot down before the second mission is accomplished.

In this embodiment, three first missions including a mission A (M1A), a mission B (M1B), and a mission C (M1C) are set corresponding to different battle areas. The friend NPC 8 is involved in one of the first missions and forms a military force.

Each first mission is to advance toward the corresponding battle area and defeat the enemy NPCs 9 (9a, 9b, and 9c) positioned in the south of the enemy air station 10 to break through a defense network formed by the enemy NPCs 9. Specifically, an enemy NPC 9 which should be defeated is associated with each first mission. In the example shown in FIG. 2, the friend NPC 8a and the enemy NPC 9a are involved in the mission A. Likewise, the friend NPC 8b and the enemy NPC 9b are involved in the mission B. The friend NPC 8c and the enemy NPC 9c are involved in the mission C.

The first mission is accomplished when the enemy NPCs 9 involved in the first mission have been defeated in a given ratio. The first mission cannot be accomplished if all of the friend NPCs 8 have been defeated. The player character 6 participates in the operation from the south of the military forces involved in the missions A to C, and arbitrarily supports the military forces so that the missions A to C are accomplished until the second mission execution condition is satisfied.

The first missions are not sequentially performed, differing from a known role-playing game (RPG) or a strategy simulation game (i.e., the next mission is performed after the preceding mission has been accomplished), but are simultaneously performed in parallel. The expression "the first missions are simultaneously performed in parallel" excludes a configuration in which only one mission is substantially performed during play (i.e., the player is notified of a plurality of missions which can be selected in advance before starting the game, and the game starts after the player has selected one of the missions). In this embodiment, the player is notified of a plurality of first missions before the game starts. However, the player does not select (input) a mission in which the player participates before the game starts. The player is automatically determined to participate in an arbitrary mission based on the action of the player at an arbitrary timing during the game so that the player can substantially seamlessly play a plurality of missions at an arbitrary timing.

Figure 3:
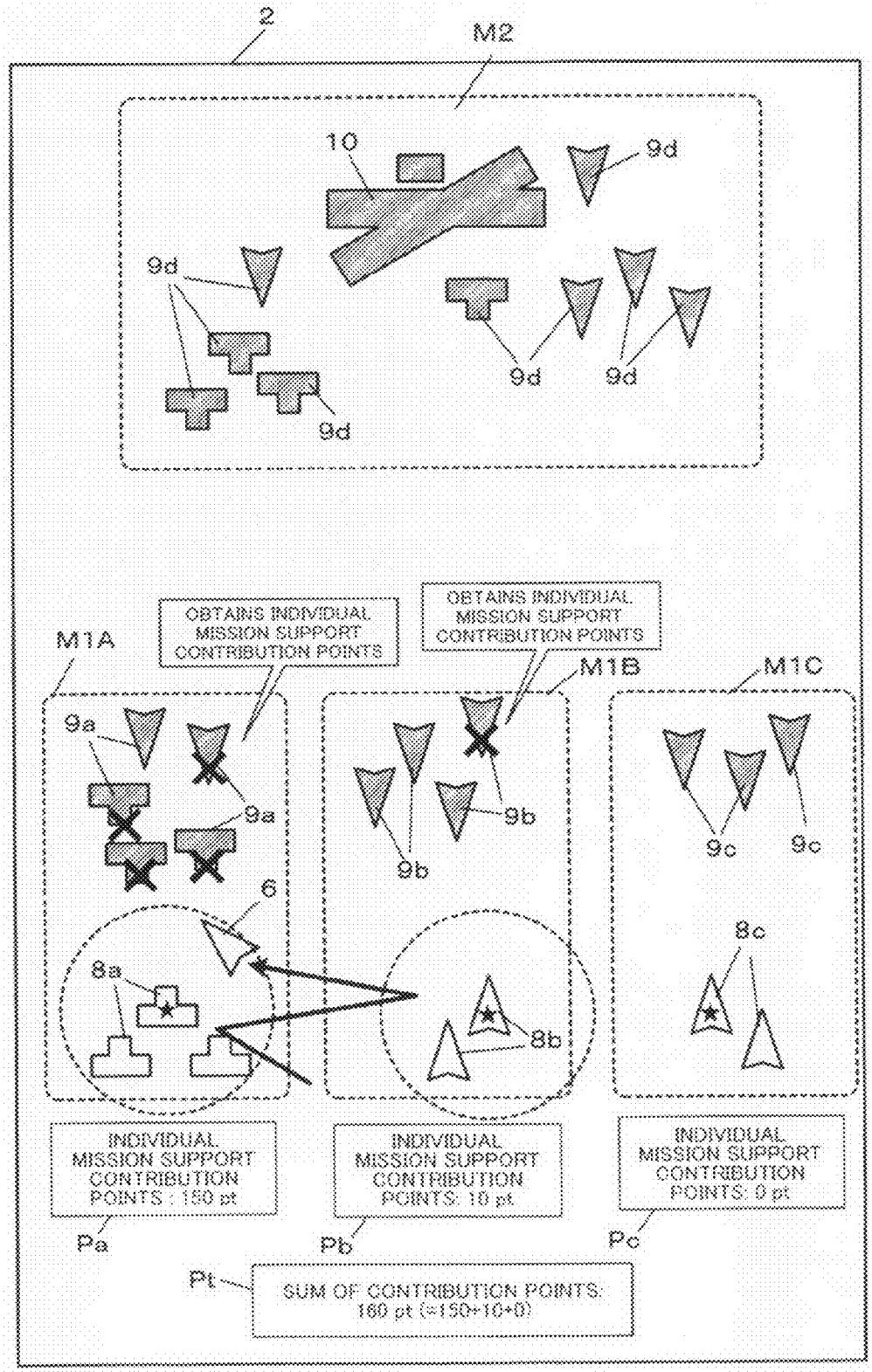
FIG. 3 is another schematic view illustrative of an outline of a combat flight simulation according to the first embodiment.

FIG. 3 is a schematic view illustrative of an outline of the combat flight simulation according to this embodiment. FIG. 3 shows a state in which the player plays the first mission before the second mission is executed. In this embodiment, as shown in FIG. 3, one of the friend NPCs 8 involved in the first mission is set to be a leader character (marked with a star in FIG. 3). When the player character 6 has been positioned within a given range (i.e., a circle indicated by a broken line in FIG. 3) around the leader character, the player character 6 is determined to have participated in the mission in which the leader character is involved. When the player character 6 has shot down the enemy NPC 9, the player character 6 is determined to have participated in the mission in which the shot-down enemy NPC 9 (9a, 9b, or 9c: marked with "x" in FIG. 3) is involved.

Individual mission support contribution points Pa, Pb, and Pc are then calculated which indicate the support results for the player character 6 relating to the individual first missions. The individual mission support contribution points Pa, Pb, and Pc are incremented each time the player character 6 has defeated the enemy NPC 9 (9a, 9b and 9c) involved in the first mission in which the player character 6 is determined to participate.

In the example shown in FIG. 3, the player character 6 is determined to have participated in the first missions A and B, and the individual mission support contribution points Pa and Pb relating to the missions A and B are incremented corresponding to the number of enemy NPCs 9 which have been defeated by the player character 6. On the other hand, since the player character 6 is not determined to have participated in the mission C, the individual mission support contribution points Pc are not calculated.

Figure 4:
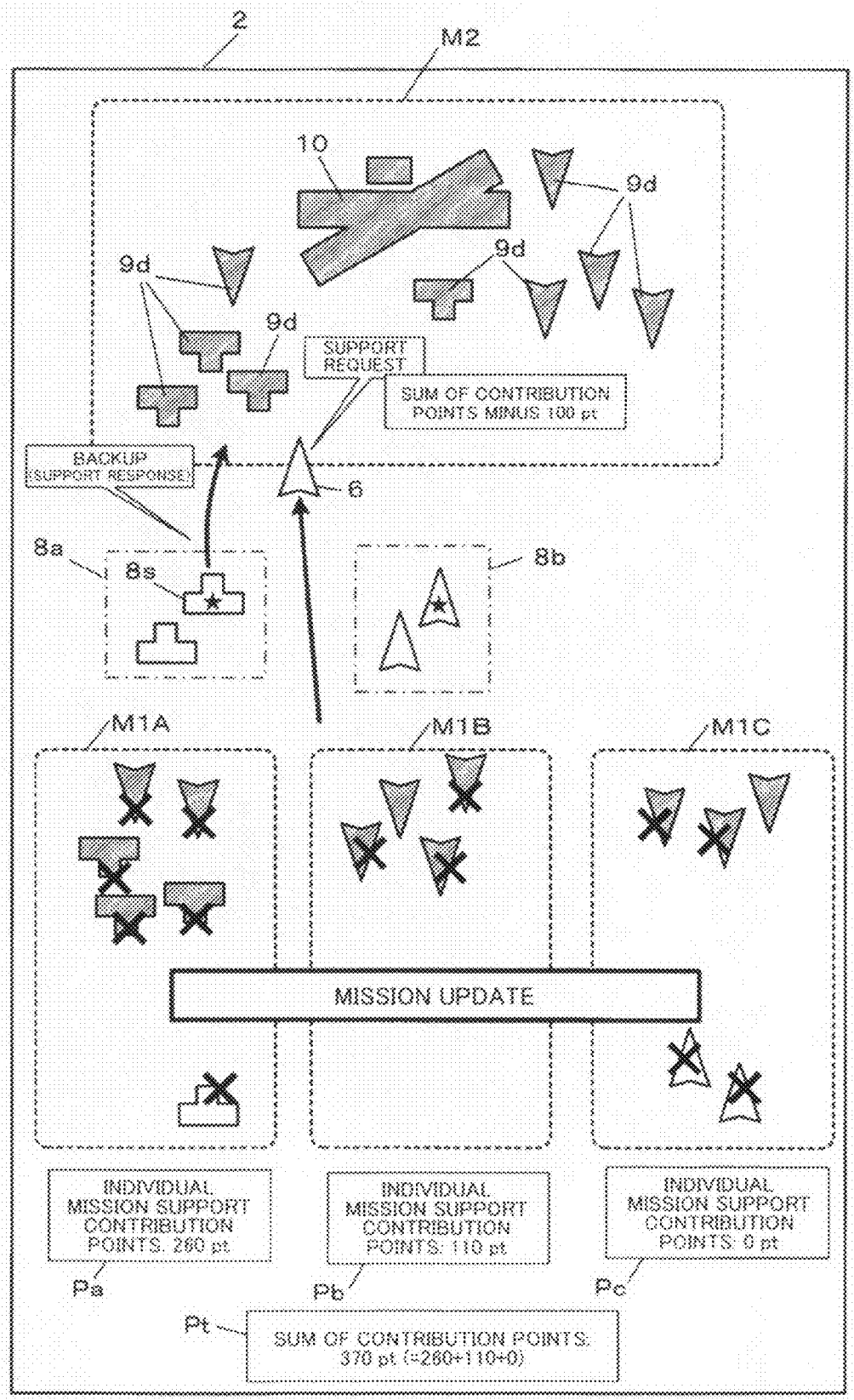
FIG. 4 is a further schematic view illustrative of an outline of a combat flight simulation according to the first embodiment.

FIG. 4 is a schematic view illustrative of an outline of the combat flight simulation according to this embodiment. FIG. 4 shows a state in which the second mission is performed. In this embodiment, the player is notified that the mission has been updated (mission update) when a given period of time has elapsed after the first missions have been performed, or when two first missions (=total number of first missions minus one) have been accomplished, and the second mission (M2) is then executed.

When the second mission has been executed, a battle relating to the first mission other than the first mission which has been determined to be accomplished or end unsuccessfully is determined to be complete. The surviving enemy NPCs 9a, 9b, and 9c involved in the first missions are excluded from the attack target, and the enemy NPCs 9d involved in the second mission are determined to be the attack target. The player character 6 must leave the battle area indicated by the first mission and advance toward the battle area indicated by the second mission in order to defeat the enemy NPCs 9d. The friend NPCs 8 which have not been defeated during the first mission are automatically controlled to leave the battle area indicated by the first mission and advance toward the battle area indicated by the second mission.

In this embodiment, the player character 6 can request the friend NPC 8 to support the player character 6 when playing the second mission. The support request consumes total support contribution points Pt (i.e., the sum of the individual mission support contribution points Pa, Pb, and Pc). In the example shown in FIG. 4, one support request requires (consumes) 100 pt (points). Since the total support contribution points Pt of the player are 370, the player can request support three times.

When the player has sent a support request, a support character 8s is selected from the friend NPCs 8 supported by the player character 6 during the first mission, and is controlled to support the player character 6.

In the example shown in FIG. 4, the missions A and B have been accomplished, and the surviving friend NPCs 8a and 8b move toward the battle area indicated by the second mission. When the player character 6 has sent a support request, the support character 8s is selected from the friend NPCs 8a and 8b. The friend NPC selected as the support character 8s suspends the operation assigned to the member of the military force to which the friend NPC belongs, approaches the player character 6, and attacks the enemy NPC 9d in front of the player character 6 or the enemy NPC 9d aiming at the player character 6. When the support character 8s has satisfied a given support finish condition, the support character 8s is controlled to return to the original military force and perform the operation assigned to the original military force.

According to this embodiment, the player can enjoy a situation in which the player character helps or is helped by another character in a game in which a number of weapons (or soldiers) deployed over a wide area participate in large-scale operations.

The above description illustrates an example in which the player character requests support during the second mission for convenience. In this embodiment, the player character can also request support during the first mission before the second mission. In this case, when at least one of the first missions has been accomplished, a support character supports the player character 6.

Functional Blocks

A specific configuration which implements the above-described game is described below.

Figure 5:
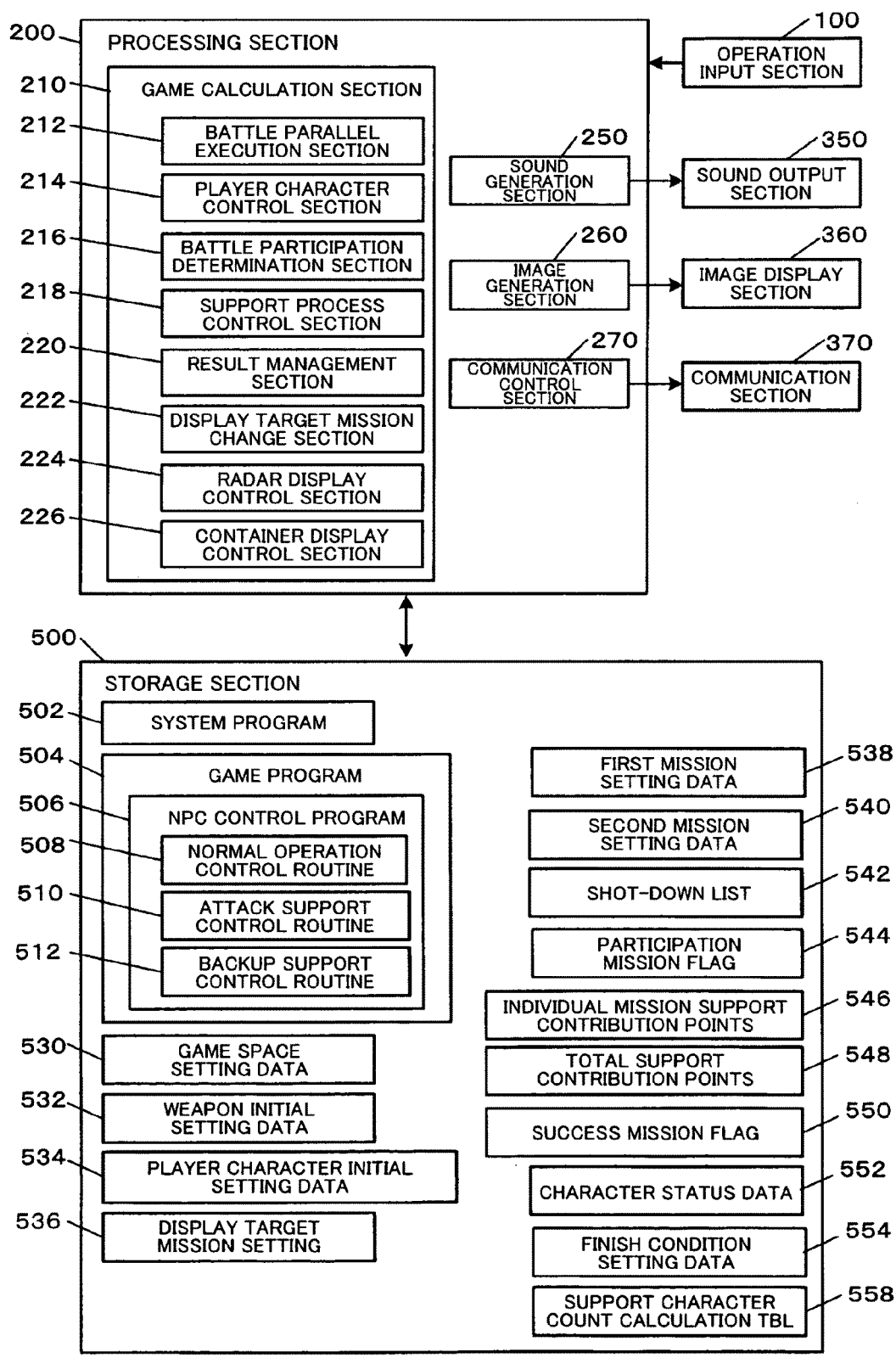
FIG. 5 is a functional block diagram showing an example of the functional configuration of a consumer game device according to the first embodiment.

FIG. 5 is a functional block diagram showing an example of the functional configuration of the consumer game device 1200 according to this embodiment. As shown in FIG. 5, the consumer game device 1200 according to this embodiment includes an operation input section 100, a processing section 200, a sound output section 350, an image display section 360, a communication section 370, and a storage section 500.

The operation input section 100 is implemented by an input device and a sensor (e.g., push button, lever, touch pad, dial, keyboard, mouse, pointer, acceleration sensor, and tilt sensor). The operation input section 100 outputs an operation input signal corresponding to an operation input performed by the player to the processing section 200. The game controller 1230 shown in FIG. 1 corresponds to the operation input section 100.

The processing section 200 is implemented by electronic components such as a microprocessor, an application-specific integrated circuit (ASIC), and an IC memory. The processing section 200 exchanges data with each functional section, and controls the operation of the consumer game device 1200 by performing various calculations based on a program, data, and the operation input signal from the operation input section 100. In FIG. 1, the control unit 1210 included in the game device main body 1201 corresponds to the processing section 200.

The processing section 200 according to this embodiment includes a game calculation section 210, a sound generation section 250, an image generation section 260, and a communication control section 270.

The game calculation section 210 performs a game process. For example, the game calculation section 210 performs a process which forms a game space in a three-dimensional virtual space, a process which controls the arrangement of objects such as characters disposed in the game space, a process which automatically controls the movement of an NPC, a hit determination process, a physical calculation process, and a game result determination process.

Specifically, the game calculation section 210 according to this embodiment includes a battle parallel execution section 212, a player character control section 214, a battle participation determination section 216, a support process control section 218, a result management section 220, a display target mission change section 222, a radar display control section 224, and a container display control section 226.

The battle parallel execution section 212 automatically controls the movement of the friend NPCs 8 and the enemy NPCs 9 so that the friend NPCs 8 and the enemy NPCs 9 fight in parallel during each first mission in different battle areas in the game space.

The player character control section 214 controls the player character 6 (e.g., movement or attack in the game space) based on an operation input performed using the operation input section 100.

The battle participation determination section 216 automatically determines the first mission in which the player character 6 has participated based on the present position of the player character 6 or the first mission in which the enemy NPC 9 shot down by the player character 6 is involved, without displaying a selection screen and allowing the player to select the first mission.

The support process control section 218 detects that the player has performed a support request operation input, and selects the support character 8s from the friend NPCs 8 involved in the mission in which the player character 6 has participated. The support process control section 218 sets a support operation finish condition for the selected support character 8s, and increases the capability parameter value of the support character 8s. The support process control section 218 causes the support character 8s to approach the present position of the player character 6, automatically search for an attack target corresponding to the type of support request, and attack the attack target (i.e., support process control). The support process control section 218 extracts the support character which satisfies the support operation finish condition, releases the extracted support character from the role of the support character, and reduces the capability parameter value of the extracted support character to the original value.

The result management section 220 manages the military results (attack results) of the first mission in which the player character 6 has participated by means of points. Specifically, the result management section 220 increments individual mission support contribution points 546 and total support contribution points 548 stored in the storage section 500 based on a determination that the enemy NPC 9 has been shot down by the player character 6 and a determination that the first mission has been accomplished, and decrements the total support contribution points 548 when the player has sent a support request.

When the display target mission change section 222 has detected that the player has performed a given display change operation input, the display target mission change section 222 changes the radar display and container display target first mission by operating a flag of a display target mission setting 536.

The term "radar display" refers to a simple image that looks down upon the game space 2 and displays the arrangement of NPCs by displaying identification marks at the positions of the friend NPCs 8 and the enemy NPCs 9 relative to the player character 6. The radar display is additionally displayed at the corner of the game screen in many cases. The term "container display" refers to an identifier which facilitates identification of the NPC displayed on the game screen. For example, the container display refers to a frame that encloses the NPC, text that indicates the assignment or the capability parameter value of the NPC, or the like.

The radar display control section 224 calculates relative position information relating to the positions of the friend NPCs 8 and the enemy NPCs 9 involved in the display target first mission with respect to the player character, and outputs the relative position information to the image generation section 260. The image generation section 260 receives the relative position information, and generates an image referred to as a "radar image", "radar screen", or "radar display".

The container display control section 226 extracts an NPC positioned within a given search range around the player character 6 from the friend NPCs 8 and the enemy NPCs 9 involved in the display target first mission, calculates the position coordinates of the extracted NPC in a game screen coordinate system, and outputs the position coordinates of the extracted NPC to the image generation section 260. The image generation section 260 receives the position coordinates of the extracted NPC, and synthesizes a container display corresponding to the attribute of the extracted NPC in the image of the game space 2 viewed from the virtual camera CM at the position coordinates of the extracted NPC in the game screen coordinate system.

The sound generation section 250 is implemented by known technology such as a processor such as a digital signal processor (DSP) and its control program. The sound generation section 250 generates sound signals of game-related effect sound, background music (BGM), and operation sound based on the processing results of the game calculation section 210, and outputs the generated sound signals to the sound output section 350.

The sound output section 350 is implemented by a device which outputs sound such as effect sound and BGM based on the sound signals input from the sound generation section 250. In FIG. 1, the speaker 1224 of the video monitor 1220 corresponds to the sound output section 350.

The image generation section 260 is implemented by known technology such as a processor such as a digital signal processor (DSP), its control program, a drawing frame IC memory such as a frame buffer, and the like. For example, the image generation section 260 generates one game image in frame time (1/60 sec) units based on the processing results of the game calculation section 210, and outputs image signals of the generated game image to the image display section 360.

The image display section 360 displays various game images based on the image signals input from the image generation section 260. For example, the image display section 360 is implemented by an image display device such as a flat panel display, a cathode ray tube (CRT), a projector, or a head mount display. In FIG. 1, the display 1222 of the video monitor 1220 corresponds to the image display section 360.

The communication control section 270 performs a data process relating to data communication to exchange data with an external device through the communication section 370.

The communication section 370 connects with a communication channel 2 and implements communication. For example, the communication section 370 is implemented by a transceiver, a modem, a terminal adapter (TA), a jack for a communication cable, a control circuit, and the like. In FIG. 1, the communication device 1212 corresponds to the communication section 370.

The storage section 500 stores a program and data defined in advance. The storage section 500 is used as a work area for the processing section 200, and temporarily stores the results of calculations performed by the processing section 200 based on various programs, data input from the operation input section 100, and the like. The function of the storage section 500 is implemented by an IC memory (e.g., RAM or ROM), a magnetic disk (e.g., hard disk), an optical disk (e.g., CD-ROM or DVD), or the like.

The storage section 500 according to this embodiment stores a system program 502 which causes the processing section 200 to integrally control the game device 1200, a game program 504 necessary for causing the processing section 200 to execute the game, various types of data, and the like. The function of the game calculation section 210 may be implemented by the processing section 200 by causing the processing section 200 to read and execute the game program 504.

The game program 504 includes an NPC control program 506 for controlling the NPC support process. The NPC control program 506 is implemented using known AI-controlled NPC technology.

The NPC control program 506 according to this embodiment includes a plurality of control routines corresponding to the type of movement control performed for the friend NPC 8. Specifically, the NPC control program 506 according to this embodiment includes (1) a normal operation control routine 508 which controls the movement of the friend NPC 8 so that the friend NPC 8 searches for and attacks the enemy NPC 9 involved in the same first mission as the friend NPC 8, (2) an attack support control routine 510 which controls the movement of the friend NPC 8 so that the friend NPC 8 selected as the support character 8s when an attack support request operation input has been performed by pressing the up key 1234U, approaches the player character 6 and searches for and attacks the enemy NPC 9 in front of the player character 6, and (3) a backup support control routine 512 which controls the movement of the friend NPC 8 so that the friend NPC 8 selected as the support character 8s when a backup support request operation input has been performed by pressing the down key 1234D, approaches the player character 6 and searches for and attacks the enemy NPC 9 aiming at the player character 6.

The storage section 500 stores game space setting data 530, weapon initial setting data 532, player character initial setting data 534, first mission setting data 538, second mission setting data 540, finish condition setting data 554, and a support character count calculation TBL 558 as data provided in advance.

The storage section 500 also stores a display target mission setting 536, a shot-down list 542, a participation mission flag 544, individual mission support contribution points 546, total support contribution points 548, a success mission flag 550, and character status data 552 as data generated during the game and rewritten at any time. The storage section 500 appropriately stores data such as angle of view/line-of-sight direction/position information for controlling the virtual camera, time limit count data, and the like as information necessary for executing the game process.

Various types of data for forming the game space 2 in the three-dimensional virtual space are stored as the game space setting data 530. For example, motion data as well as model data and texture data relating to objects (e.g., the sky, earth's surface, and buildings) are stored as the game space setting data 530.

Initial setting data relating to a weapon that appears in the game is stored as the weapon initial setting data 532 corresponding to each type of weapon. Specifically, the initial capability parameter value (e.g., weapon display model, texture, maximum speed, maximum acceleration, durability (initial hit point), performance, type of equipment, and number of pieces of equipment) of each weapon is stored as the weapon initial setting data 532.

Initial setting data relating to a fighter aircraft as the player character 6 is stored as the player character initial setting data 534. Specifically, the initial capability parameter value (e.g., display model, texture, initial position coordinates, maximum speed, maximum acceleration, durability (initial hit point), performance, type of equipment, and number of pieces of equipment) of the fighter aircraft as the player character 6 is stored as the player character initial setting data 534.

The display target mission setting 536 is information which designates the first mission for which the NPCs are selectively subjected to the radar display and the container display. As shown in FIG. 6, a display target flag 536b is stored as the display target mission setting 536 while being associated with each mission type 536a, for example. The mission for which "1" is stored in the display target flag 536b is set to be the display target. In this embodiment, four mission types including "all missions", "mission A", "mission B", and "mission C" are set as the mission type 536a. The flag is necessarily set at "1" for only one of the four mission types. The mission type "all missions" is set to be the display target in the initial state.

The first mission setting data 538 is information that defines each first mission. In this embodiment, data sets relating to each of the missions A to C are stored as the first mission setting data 538. The first mission setting data 538 defines NPCs involved in each mission.

Figure 7:
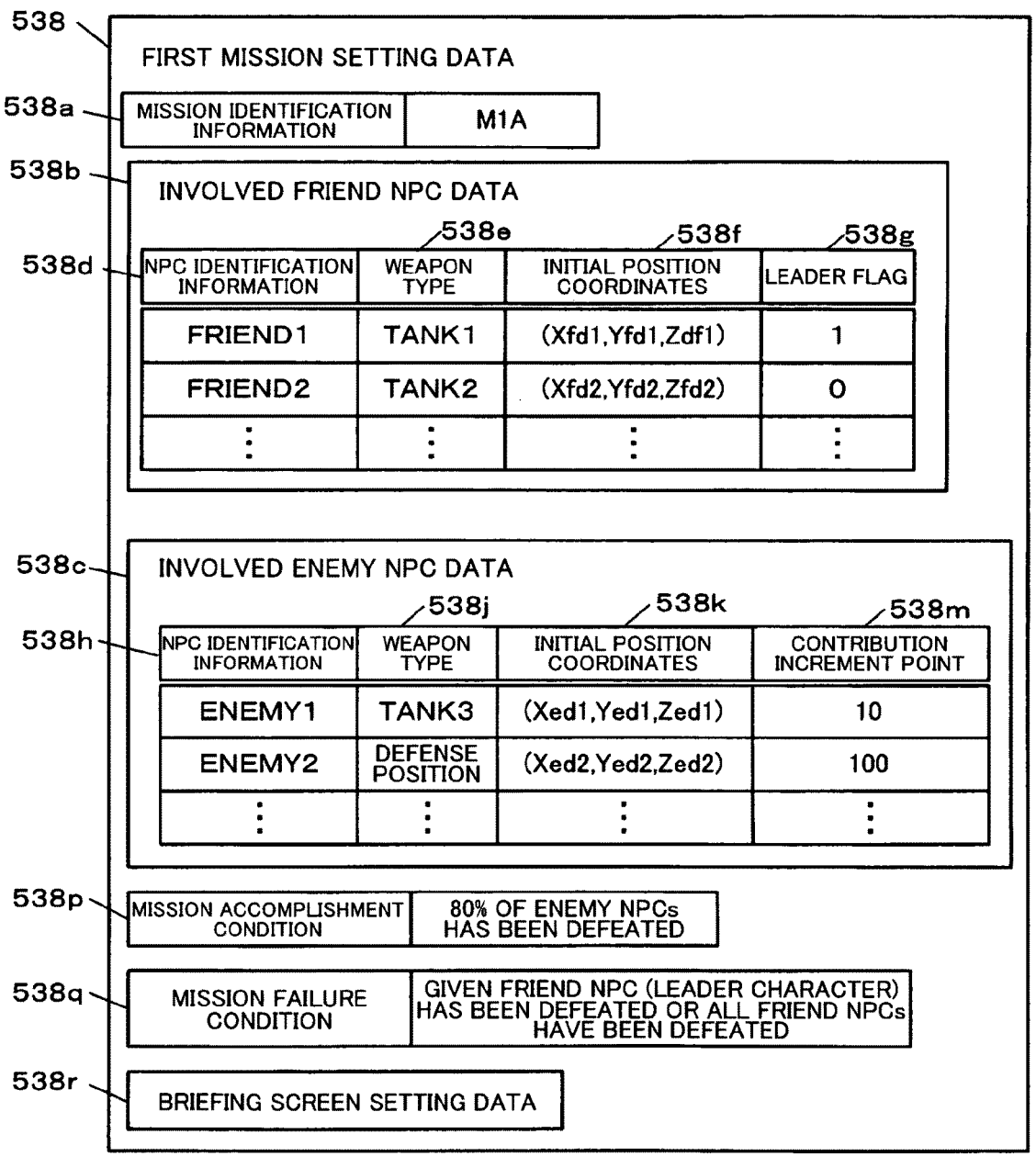
FIG. 7 is a data configuration diagram showing a data configuration example of first mission setting data.

As shown in FIG. 7, one data set includes mission identification information 538a relating to the first mission, involved friend NPC data 538b that is information relating to the friend NPCs which are involved (participate or appear) in the first mission, involved enemy NPC data 538c that is information relating to the enemy NPCs involved in the first mission, a mission accomplishment (clear) condition 538p, a mission failure (over) condition 538q, and briefing screen setting data 538r.

NPC identification information 538d relating to the friend NPC 8 involved in the first mission, a weapon type 538e, initial position coordinates 538f, and a leader flag 538g are stored as the involved friend NPC data 538b while being associated with one another. The weapon type 538e corresponds to the weapon identification information defined by the weapon initial setting data 532. "1" is stored in the leader flag 538g corresponding to the leader character of the friend NPCs which participate in the first mission.

NPC identification information 538h relating to the enemy NPC 9 involved in the first mission, a weapon type 538j, initial position coordinates 538k, and contribution increment points 538m are stored as the involved enemy NPC data 538c while being associated with one another. The contribution increment points 538m define points added to the individual mission support contribution points 546 when the player character 6 has defeated the enemy NPC.

The mission accomplishment condition 538p is information that defines a condition whereby the first mission is accomplished (cleared). The mission failure condition 538q is information that defines a condition whereby the first mission is determined to have ended in failure.

Information for displaying a screen that informs the player of an outline of military operations before the first mission is stored as the briefing screen setting data 538r.

Figure 8:
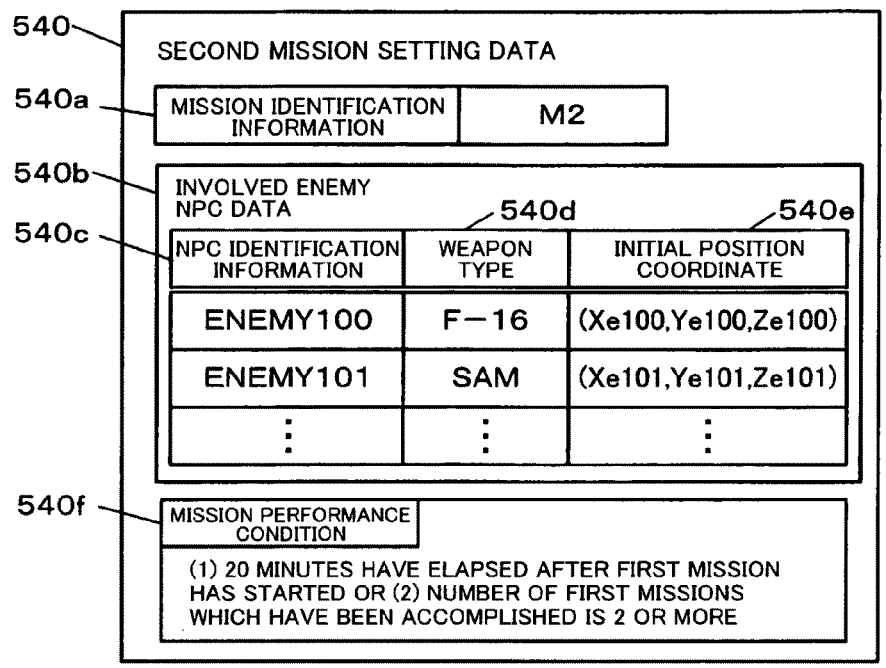
FIG. 8 is a data configuration diagram showing a data configuration example of second mission setting data.

The second mission setting data 540 is information that defines the second mission. As shown in FIG. 8, mission identification information 540a, involved enemy NPC data 540b that defines the enemy NPC 9 involved in the second mission, and a mission performance condition 540f are stored as the second mission setting data 540, for example.

NPC identification information 540c, a weapon type 540d, and initial position coordinates 540e are stored as the involved enemy NPC data 540b while being associated with one another.

The mission performance condition 540f is information that defines a condition whereby the second mission is generated and performed. In this embodiment, two OR conditions including (1) a condition whereby a given period of time (e.g., 20 minutes) has elapsed after the first missions have been performed, and (2) a condition whereby two (=total number of first missions minus one) or more first missions have been accomplished are set as the mission performance conditions.

The condition (1) allows an inexperienced player to proceed with the game even if the player cannot accomplish the first mission. However, a support character does not appear in response to a support request when the first missions have not been accomplished. The condition (2) prevents even a skilled player from accomplishing all of the first missions. Specifically, since the player must select two of the first missions, the game process during the second mission is provided with variety.

The NPC identification information relating to the enemy NPC 9 defeated or shot down by the player character 6 during the game is stored as the shot-down list 542.

Figure 9:
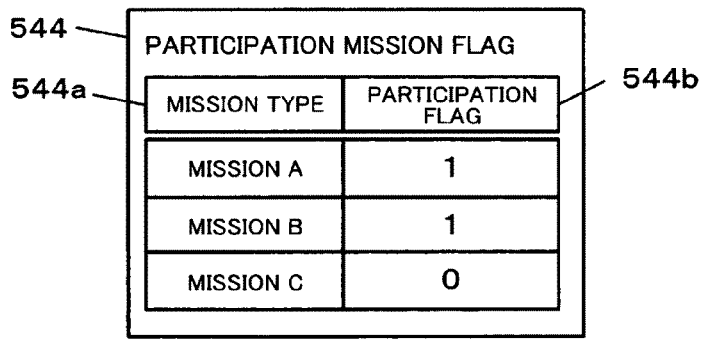
FIG. 9 is a data configuration diagram showing a configuration example of a participation mission flag.

As shown in FIG. 9, a mission type 544a of the first mission and a participation flag 544b are stored as the participation mission flag 544 while being associated with each other, for example. The participation flag 544b set at "1" indicates that the player character 6 has participated in the corresponding mission or supported the friend NPC 8 in the corresponding mission. The state shown in FIG. 9 corresponds to the state shown in FIG. 3 (i.e., participation flags 544b corresponding to the missions A and B are set at "1").

Figure 10:
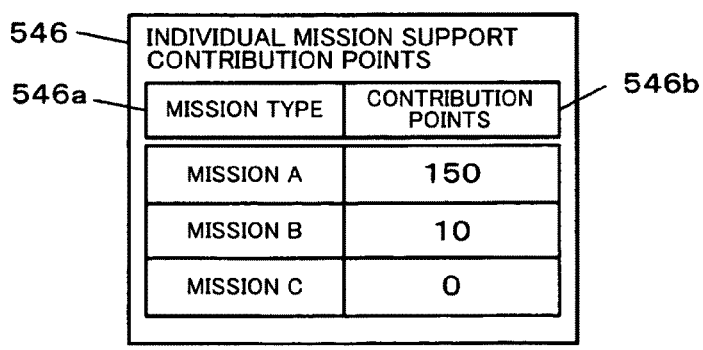
FIG. 10 is a data configuration diagram showing a data configuration example of individual mission support contribution points.

The support results (points) for the player character 6 during each first mission are stored as the individual mission support contribution points 546. As shown in FIG. 10, a mission type 546a and contribution points 546b are stored as the individual mission support contribution points 546 while being associated with each other, for example. When the player character 6 has defeated or shot down the enemy NPC 9, the contribution increment points 538m (see FIG. 7) defined corresponding to that enemy NPC 9 are added to the contribution points 546b, and given points (e.g., 100 pt) are added to the contribution points 546b when the mission has been accomplished. The state shown in FIG. 10 corresponds to the state shown in FIG. 3 (i.e., 150 pt and 10 pt are stored as the contribution points 546b corresponding to the missions A and B).

The sum of the contribution points 546b contained in the individual mission support contribution points 546 is stored as the total support contribution points 548.

The success mission flag 550 is information indicating the first mission which has been determined to be accomplished. As shown in FIG. 11, a mission type 550a of the first mission and a success flag 550b are stored as the success mission flag 550 while being associated with each other, for example. "1" is stored in the success mission flag 550 corresponding to the first mission which has been determined to be accomplished.

Various parameter values indicating the present positions and the state of the friend NPCs 8, the enemy NPCs 9, and the player character 6 disposed in the game space 2 are stored as the character status data 552. As shown in FIG. 12, an involved mission 552b which is the identification information relating to the mission in which the character is involved, present position coordinates 552c, a present speed 552d, a capability parameter value 552h (e.g., maximum speed, the number of remaining bullets/missiles, and durability value corresponding to the present hit point), a support character flag 552i, finish condition identification information 552k, and attack target character identification information 552m that indicates the attack target character are stored as the character status data 552 while being associated with character identification information 552a. Information indicating the posture of the aircraft and the like may also be appropriately stored as the character status data 552 while being associated with character identification information 552a.

The durability value as the capability parameter value 552h is decreased each time the corresponding character is attacked, and is set at "0" when the character has been shot down. The support character flag 552i set at "1" indicates that the corresponding NPC is a character that supports the player character 6 in responce to a support request from the player character 6. The finish condition identification information 552k is identification information relating to a finish condition set to be a condition whereby the support character 8s finishes the support operation. A specific finish condition can be determined referring to the finish condition setting data 554 based on the stored identification information. The identification information relating to the attack target character of the corresponding character is stored as the attack target character identification information 552m. When the identification information relating to the player character 6 is stored as the attack target character identification information 552m, the corresponding character is identified as a character which aims at the player character 6.

Information relating to a condition whereby the selected support character 8s finishes the support operation when a support request has been sent from the player character 6 and the support character 8s supports the player character 6 is stored as the finish condition setting data 554. As shown in FIG. 13, finish condition identification information 554b and a finish condition option 554c are stored as the finish condition setting data 554 while being associated with each other corresponding to each point range 554a of the individual mission support contribution points, for example. The finish condition option 554c is an OR condition whereby the finish condition is satisfied. In this embodiment, the operation time and the number of targets to be defeated during the support operation increase as the individual mission support contribution points corresponding to the first mission in which the selected support character is involved increases. Note that use of a special weapon possessed by the character may be defined as the finish condition option in addition to the operation time and the number of targets to be defeated during the support operation, for example.

The support character count calculation TBL 558 is table (TBL) data referred to when selecting the number of support characters. As shown in FIG. 14, a point range 558a of the individual mission support contribution points and a support character count 558b are stored as the support character count calculation TBL 558 while being associated with each other, for example. In this embodiment, the number of support characters to be selected increases as the individual mission support contribution points corresponding to the first mission in which the selected support character is involved increase.

Process Flow

The flow of the process according to this embodiment is described below. The following process is implemented by causing the processing section 200 to execute the game program 504. Note that known technology may be appropriately applied to automatic control of the friend NPC 8 and the enemy NPC 9. Therefore, detailed description thereof is omitted.

Figure 15:
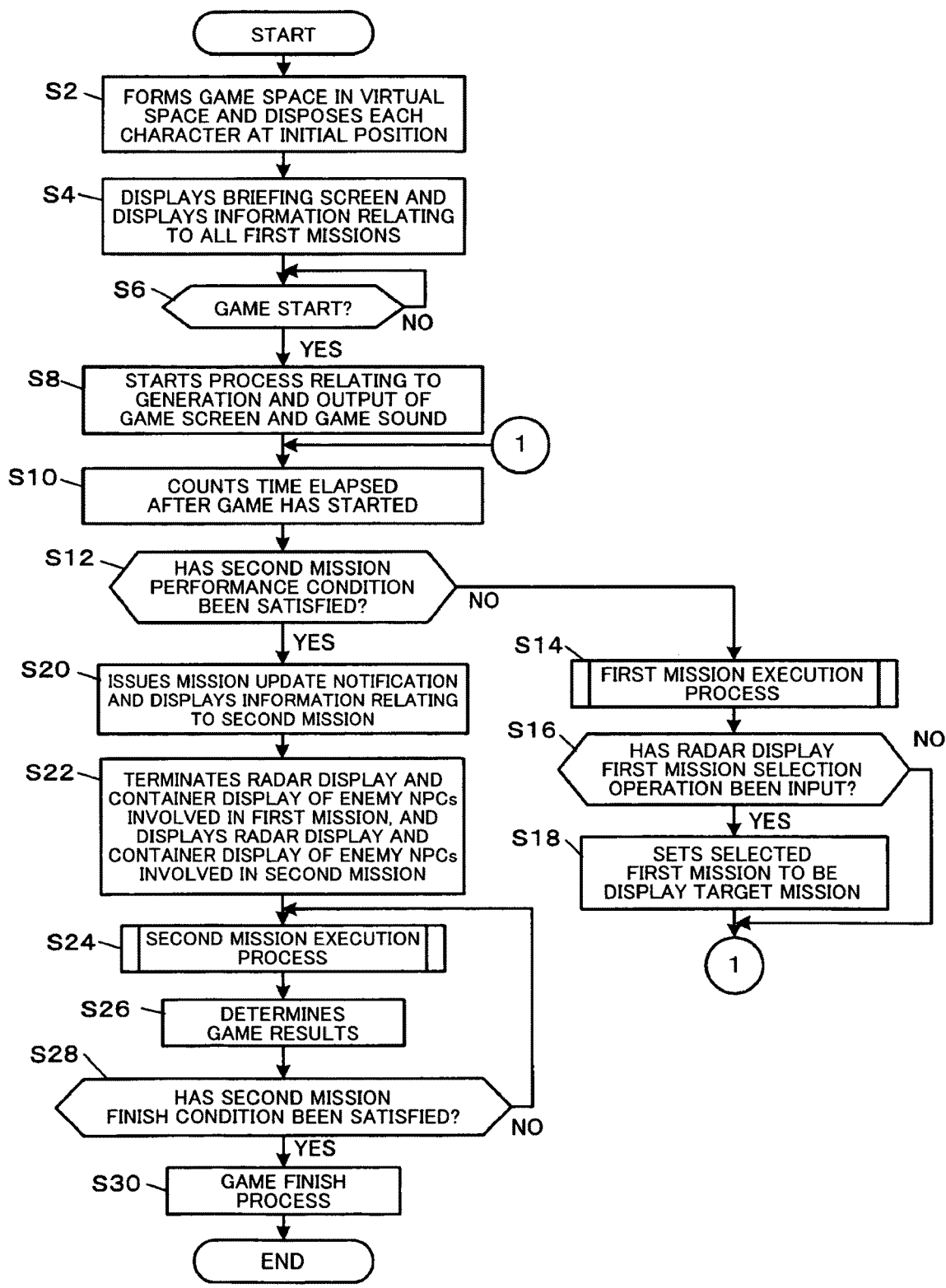
FIG. 15 is a flowchart illustrative of the flow of the main game process according to the first embodiment.
Figure 16:
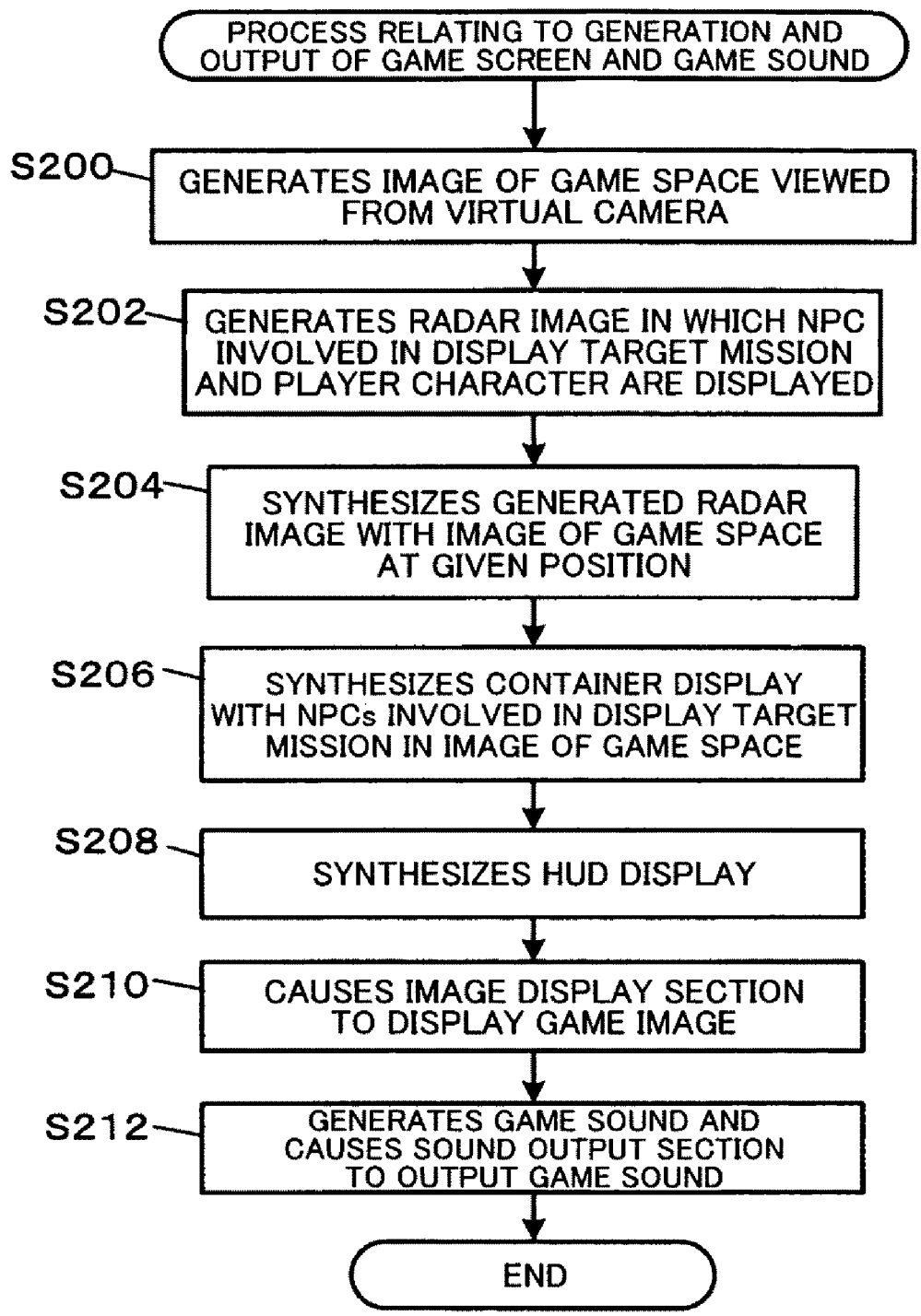
FIG. 16 is a flowchart illustrative of the flow of a process relating to generation and output of a game screen and game sound according to the first embodiment.

FIG. 15 is a flowchart illustrative of the flow of the main game process according to this embodiment. FIG. 16 is a flowchart illustrative of the flow of a process relating to generation and output of a game screen and game sound according to this embodiment. This process is executed in a cycle (constant time cycle) corresponding to the display cycle of the display 1222.

The flow of the main game process shown in FIG. 15 is as follows. As shown in FIG. 15, the game calculation section 210 disposes terrain, a building, and the like in the virtual space referring to the game space setting data 530 to form the game space 2 (i.e., battlefield). The game calculation section 210 disposes the player character 6, the friend NPCs 8 and the enemy NPCs 9 involved in each first mission at the initial position coordinates referring to the player character initial setting data 534 and the first mission setting data 538 (step S2).

Figure 21:
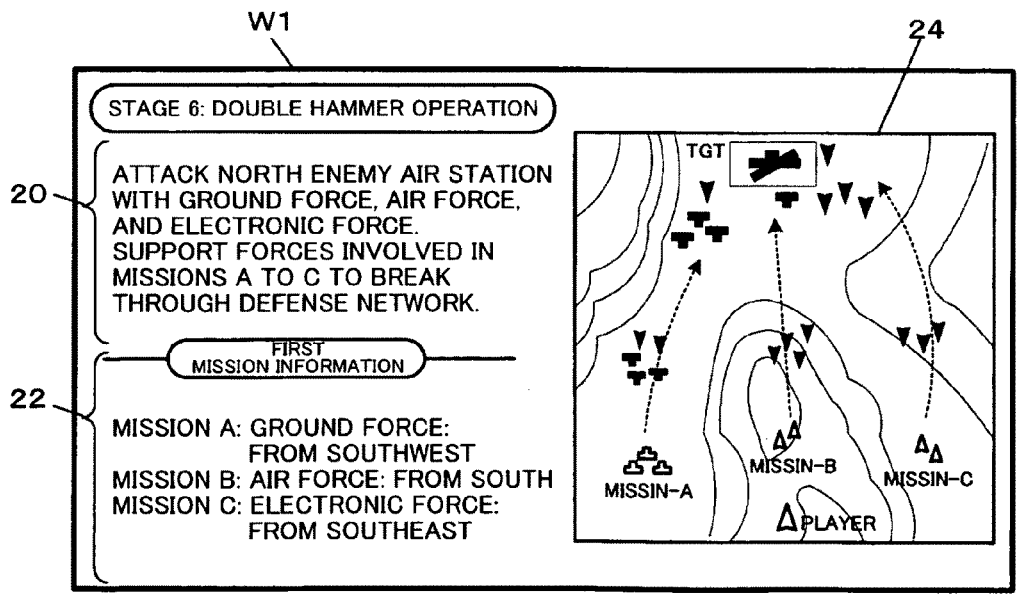
FIG. 21 is a view showing an example of a briefing screen.

The game calculation section 210 then displays a briefing screen which provides the player with information relating to a plurality of first missions referring to the briefing screen setting data 538r contained in the first mission setting data 538 (step S4). As shown in FIG. 21, operation information 20 including the objective of the second mission, first mission information 22, and an operation map 24 which shows an operation schedule are displayed on a briefing screen W1, for example.

The first mission information 2022 includes mission identification information, information relating to the military force which participates in the mission (e.g., information relating to the organization of the military force), information relating to the battle area where the mission is performed, and the like. The briefing screen W1 allows to the player to be notified of the final battle target (objective of the second mission) before the game starts, and to plan his strategy for obtaining more effective support from the friend NPCs during the game by supporting the friend NPCs in an appropriate place in the game space.

When a game start operation has been input (YES in step S6), the game calculation section 210 starts the process relating to generation and output according of a game screen and game sound described later (step S8). The game calculation section 210 counts the time elapsed after the game has started (step S10), and determines whether or not the mission performance condition 540f has been satisfied referring to the second mission setting data 540 (step S12).

When the game calculation section 210 has determined that the mission performance condition 540f for the second mission has not been satisfied (NO in step S12), the game calculation section 210 executes a first mission execution process for the player to play the first mission (step S14).

Figure 17:
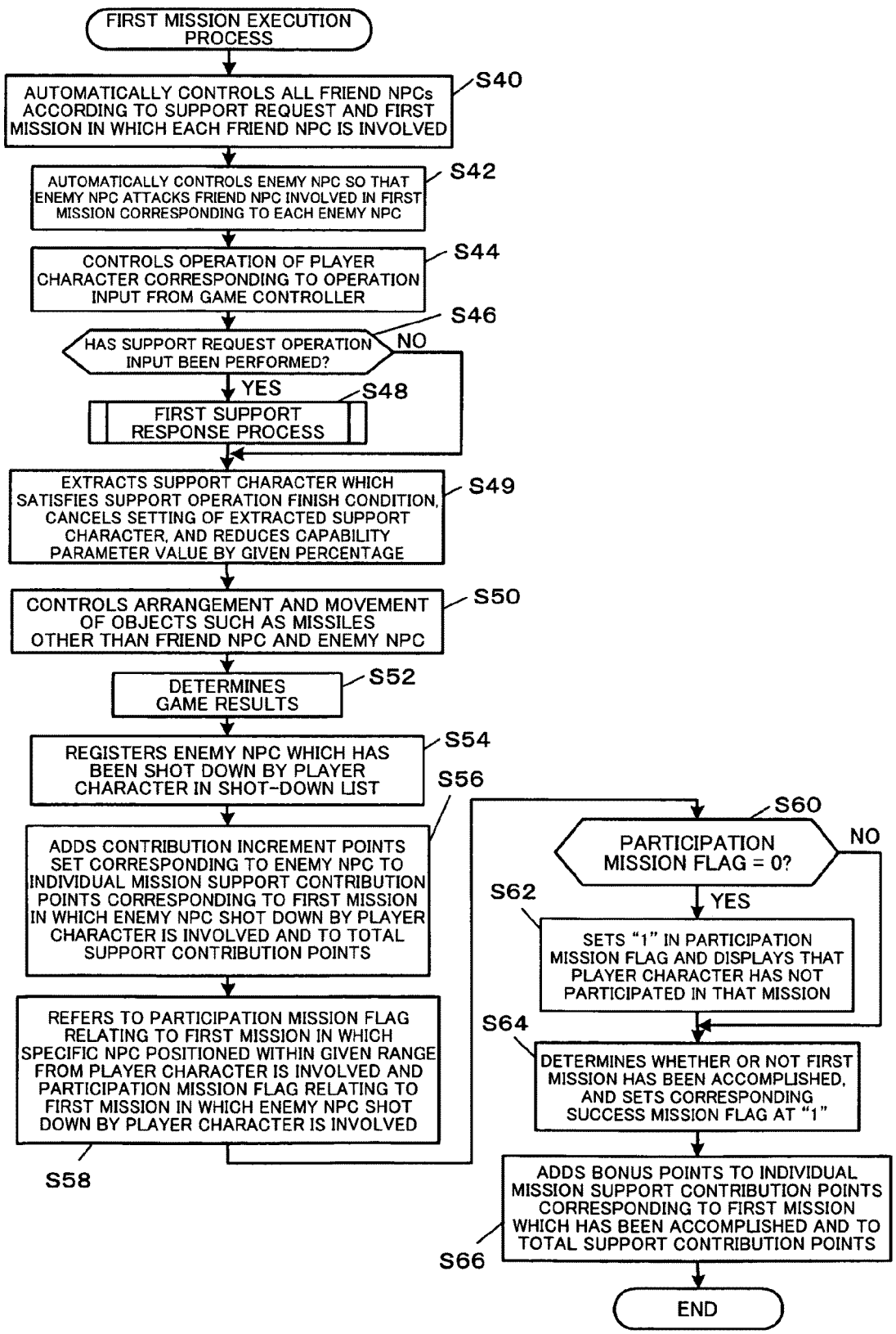
FIG. 17 is a flowchart illustrative of the flow of a first mission execution process according to the first embodiment.

FIG. 17 is a flowchart illustrative of the flow of the first mission execution process according to this embodiment. In the first mission execution process, as shown in FIG. 17, the game calculation section 210 automatically controls the available friend NPCs 8 to fight a battle corresponding to a support request and the first mission in which each friend NPC 8 is involved (step S40).

In the example shown in FIG. 3, the ground-force friend NPCs 8a involved in the mission A are controlled so that the friend NPCs 8a move from the southwest toward the representative position of the enemy airport facilities 10 set in advance, and search for and attack the ground force (enemy NPCs 9a) deployed in front of the friend NPCs 8a. The air-force friend NPCs 8b involved in the mission B are controlled so that the friend NPCs 8b move from the south toward the representative position of the enemy airport facilities 10 set in advance, and search for and attack the interception force (enemy NPCs 9b). The electronic-force friend NPCs 8c involved in the mission C are controlled so that the friend NPCs 8c move from the southeast toward the representative position of the enemy airport facilities 10 while taking electronic countermeasures (ECM).

The friend NPC 8 selected as the support character 8s which supports the player character 6 in response to a support request from the player character 6 is controlled so that the support character 8s responds to the support request based on the control routine corresponding to the type of support request instead of the above-described automatic control corresponding to the first mission in which the support character 8s is involved.

Specifically, when the friend NPC 8 has been selected as the support character 8s which supports the player character 6 in response to an attack request from the player character 6, the support character 8s is controlled so that the support character 8s approaches the present position of the player character 6, and searches for and attacks the enemy NPC deployed within a forward attack range of the player character 6 based on the attack support control routine 510. When the friend NPC 8 has been selected as the support character 8s which supports the player character 6 in response to a rescue request from the player character 6, the support character 8s is controlled so that the support character 8s approaches the present position of the player character 6, and searches for and attacks the enemy NPC deployed within a forward attack range of the player character 6 based on the backup support control routine 512. Specifically, the game calculation section 210 refers to the character status data 552 relating to the enemy NPC 9 positioned within a given radius from the player character 6, extracts the enemy NPC for the player character set in the attack target character identification information 552m, and sets the extracted enemy NPC to be the attack target of the support character 8s.

Since the total support contribution points 548 have not reached a value required for issuing a support request (100 pt in this embodiment) immediately after the game has started, the support character 8s is not selected even if a support request operation input has been performed, as described later. Therefore, the game calculation section 210 does not perform control which causes the friend NPC 8 to support the player character 6 until a certain period of time has elapsed after the game has started.

The game calculation section 210 then automatically controls all the enemy NPCs 9 so that each enemy NPC 9 searches for and attacks the friend NPCs 8 involved in the first mission corresponding to each enemy NPC 9 (step S42).

The game calculation section 210 then controls the operation (e.g., movement or attack) of the player character 6 corresponding to an operation input from the game controller 1230 (step S44). In this embodiment, since the virtual camera CM follows the player character 6 and photographs the state of the game space 2 from the viewpoint of the cockpit of the player character 6, the virtual camera CM is moved in the same amount as the player character 6.

The game calculation section 210 determines whether or not a support request operation input has been performed (step S46). In this embodiment, the game calculation section 210 determines that an attack support request operation input has been performed when the up key 1234U has been operated, and determines that a backup support request operation input has been performed when the down key 1234D has been operated.

When the game calculation section 210 has determined that a support request operation input has been performed (YES in step S46), the game calculation section 210 executes a first support response process (step S50).

Figure 18:
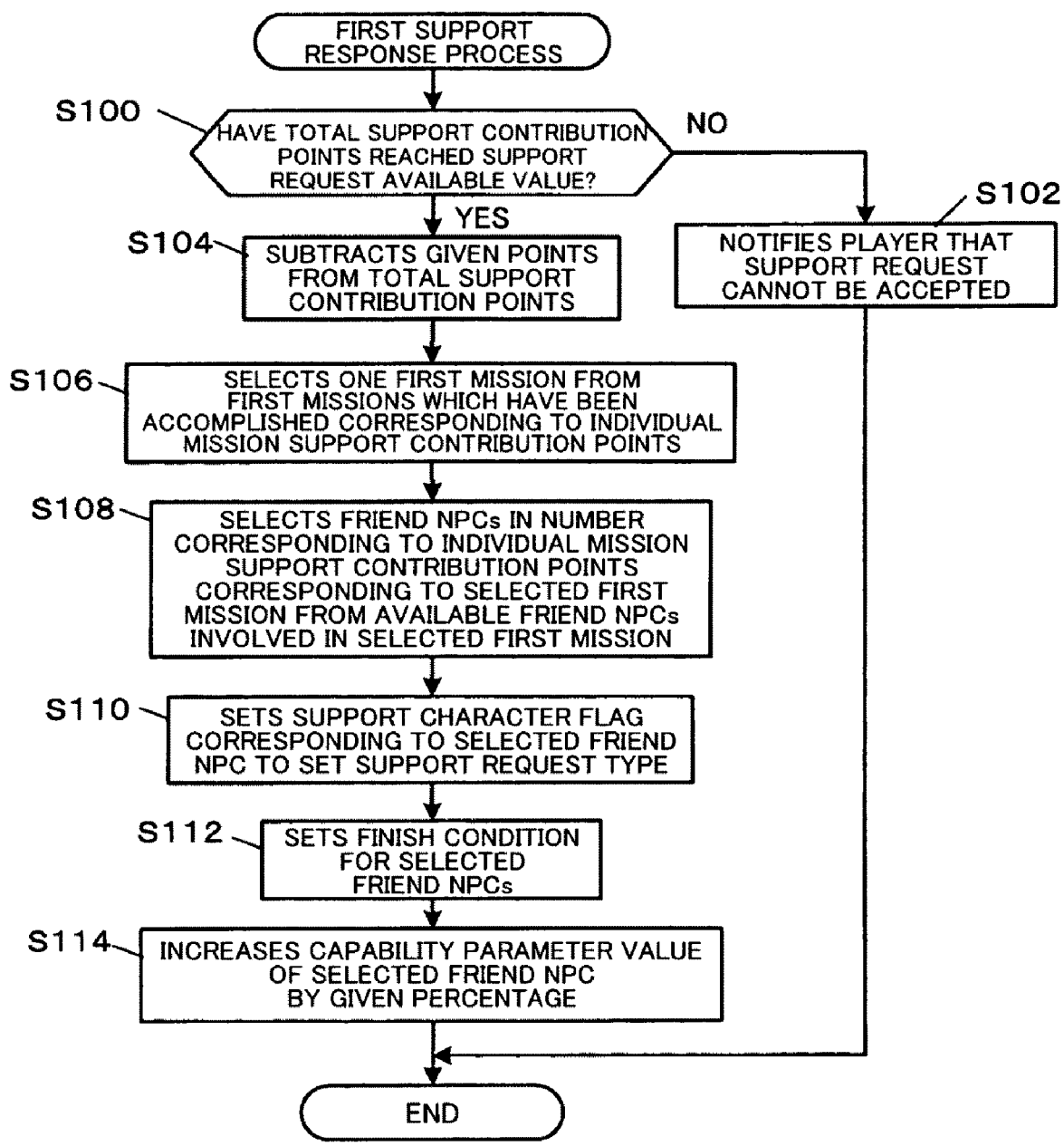
FIG. 18 is a flowchart illustrative of the flow of a first support response process according to the first embodiment.

FIG. 18 is a flowchart illustrative of the flow of the first support response process according to this embodiment. In the first support response process, as shown in FIG. 18, the game calculation section 210 determines whether or not the total support contribution points 548 have reached a support request available value (100 pt in this embodiment) required for one support request (step S100). When the game calculation section 210 has determined that the total support contribution points 548 have not reached the support request available value (NO in step S100), the game calculation section 210 notifies the player that the support request cannot be accepted (step S102). Specifically, a voice of the friend pilot saying "sorry that we cannot help you" may be output, for example.

When the game calculation section 210 has determined that the total support contribution points 548 have reached the support request available value (YES in step S100), the game calculation section 210 subtracts given points (100 pt in this embodiment) from the total support contribution points 548 (step S104). Specifically, the player consumes the total support contribution points 548.

The game calculation section 210 then selects the support character which supports the player character 6.

The game calculation section 210 selects one first mission from the first missions which have been determined to be accomplished referring to the success mission flag 550 (step S106). The game calculation section 210 then refers to the character status data 552 and the support character count calculation TBL 558, and selects the friend NPCs 8 as support characters in a number corresponding to the individual mission support contribution points 546 corresponding to the selected first mission from the available friend NPCs 8 involved in the selected first mission (step S108).

The game calculation section 210 stores "1" in the support character flag 552*i* contained in the character status data 552 corresponding to the selected friend NPC 8 to set the selected friend NPC 8 to be a support character. The game calculation section 210 stores information indicating the type of support request (i.e., "attack" or "backup") as the support request type 552*j* corresponding to whether the up key 1234U or the down key 1234D has been operated in the step S46 (step S110).

The game calculation section 210 sets the finish condition corresponding to the type of support request for the support character 8*s* selected in the step S108 (step S112).

Specifically, the game calculation section 210 refers to the finish condition setting data 554, and selects the finish condition identification information 554*b* corresponding to the point range 554*a* corresponding to the contribution points 546 relating to the first mission in which the friend NPC selected as the support character in the step S108 is involved. The game calculation section 210 then stores the selected finish condition identification information 554*b* as the finish condition identification information 552*k* relating to the selected friend NPC.

The game calculation section 210 then increases the capability parameter value of the support character 8*s* selected in the step S108 by a given percentage (step S1114). Specifically, the game calculation section 210 increases the capability parameter value 552*h* of the support character by 1.2 referring to the character status data 552, for example. Therefore, since the maximum speed and the acceleration of the support character increase, the support character can quickly support the player character 6 in response to a support request. Moreover, since the durability value corresponding to the hit point increases, the support character is rarely shot down even if the support character comes under attack when approaching the player character 6. Specifically, the player can be supported more reliably and effectively. The game calculation section 210 thus completes the first support response process, and returns to the flow shown in FIG. 17.

The game calculation section 210 then extracts the support character which satisfies the support operation finish condition, cancels the support setting (support request type 552*j*) of the extracted support character, and reduces the capability parameter value by a given percentage (step S49). Specifically, the game calculation section 210 reduces the character parameter of the extracted support character by 1/1.2 corresponding to the percentage employed in the step S114 referring to the character status data 552, for example.

The game calculation section 210 then controls the arrangement and the movement of objects (e.g., missiles launched) other than the friend NPCs and the enemy NPCs (step S50). Therefore, a battle state in which various NPCs simultaneously fight against one another in various places in the game space is implemented by the steps S40 to S44 and the step S50. A situation in which a support character is selected when the player character 6 has sent a support request during the battle and the support character supports the player character 6 is implemented by the steps S46 and S48.

The game calculation section 210 then determines the game results (step S52). The game calculation section 210 determines the game results by performing a hit determination process, determining collision between the characters or collision between the character and a structure (e.g., ground or building) in the game space, and determining damage to each character, for example.

The game calculation section 210 registers the enemy NPC 9 shot down by the player character 6 in the shot-down list 542 (step S54). The game calculation section 210 adds the contribution increment points 538*m* (see FIG. 7) set corresponding to the enemy NPC 9 to the individual mission support contribution points 546 corresponding to the first mission in which the enemy NPC 9 shot down by the player character 6 is involved and to the total support contribution points 548 (step S56). The support contribution points are thus increased.

The game calculation section 210 then refers to the participation mission flag 544 relating to the first mission in which a specific NPC (leader character) positioned within a given range from the player character 6 is involved and the participation mission flag 544 relating to the first mission in which the enemy NPC 9 shot down by the player character 6 is involved (step S58). When the participation mission flag 544 is set at "0" (YES in step S60), the game calculation section 210 sets "1" in the participation mission flag 544 (i.e., since the player character 6 has not participated in that mission), and displays that the player character 6 has not participated in that mission on the game screen (step S62). Specifically, whether or not the player character 6 has participated in the first mission can be determined based on the present position of the player character 6, and the player can be notified that the player character 6 has not participated in the first mission by the steps S58 to S60.

The game calculation section 210 then determines whether or not the first mission for which "1" is set in the participation mission flag 544 has been accomplished (determines whether or not combat corresponding to the first mission has completed), and sets the success mission flag 544 corresponding to the first mission which has been accomplished at "1" (step S64). The game calculation section 210 then adds given bonus points to the individual mission support contribution points 546 corresponding to the first mission which has been accomplished and to the total support contribution points 548 (step S66). The game calculation section 210 thus completes the first mission execution process.

A state in which the friend NPCs 8 fight against the enemy NPCs 9 in parallel in each battle area in the game space 2 can be implemented by the first mission execution process.

Again referring to the flow shown in FIG. 15, the game calculation section 210 then determines whether or not a radar display first mission selection operation (change operation) has been input (step S16). In this embodiment, when the right key 1234R or the left key 1234L has been operated, the game calculation section 210 determines that a radar display target first mission selection operation has been performed.

When the game calculation section 210 has determined that a radar display target first mission selection operation has been performed (YES in step S16), the game calculation section 210 changes the display target mission setting 536 corresponding to the selection operation (step S18). In this embodiment, all missions are set to be the display target in the initial state. A target for which the flag is set at "1" is changed in the order of "all missions", "mission A", "mission B", and "mission C" corresponding to the right/left input each time the radar display target first mission selection operation is performed. When the game calculation section 210 has changed the display target mission setting 536, the game calculation section 210 returns to the step S10.

The process relating to generation and output of a game screen and game sound started in the step S8 is executed cyclically during the game so that the game screen is generated and output.

FIG. 16 is a flowchart illustrative of the flow of the process relating to generation and output of a game screen and game sound. This process is executed by the processing section 200 (particularly the image generation section 260 and the sound generation section 250) in a cycle corresponding to the display cycle of the display 1222.

The image generation section 260 generates an image of the game space viewed from the virtual camera CM (step S200). Specifically, the image generation section 260 acquires arrangement information relating to various objects (e.g., objects forming the game space, player character, friend NPCs, enemy NPCs, and display objects) from the game calculation section 210, and generates an image viewed from the virtual camera CM.

The image generation section 260 then refers to the display target mission setting 536, and generates a radar image in which the available friend NPCs 8 and enemy NPCs 9 involved in the first mission set to be the display target and the player character 6 are displayed with given marks (step S202). The image generation section 260 appropriately synthesizes the radar image with the image of the game space generated in the step S200 (step S204).

The image generation section 260 then refers to the display target mission setting 536, and synthesizes a container display with the NPCs displayed in the image of the game space among the friend NPCs 8 and the enemy NPCs 9 involved in the first mission set to be the display target (step S206). The image generation section 260 further synthesizes a head-up display (HUD) including a symbol "W", altitude display, speed display, and the like (step S208) to complete a game screen. The image generation section 260 causes the image display section 360 to display the game image (step S210). The sound generation section 250 generates game sound, and causes the sound output section 350 to output the generated game sound (step S212).

Figure 22:
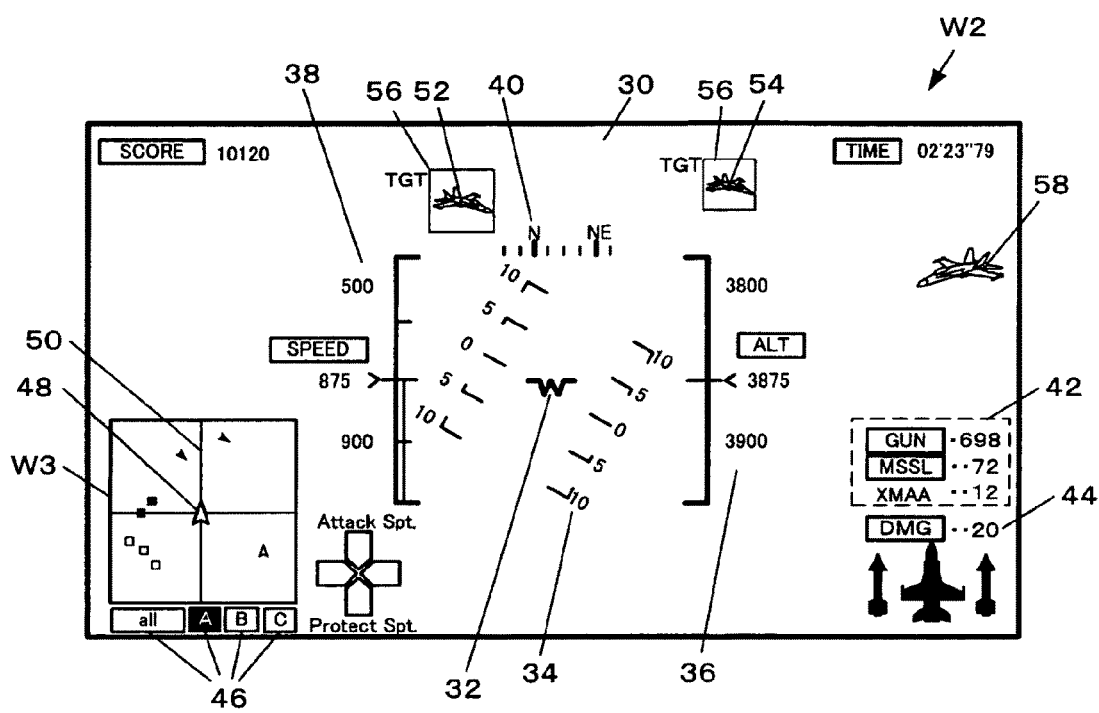
FIG. 22 is a view showing an example of a game screen.

FIG. 22 is a view showing an example of a game screen according to this embodiment. In a game screen W2 shown in FIG. 22, a symbol "W" 32, a position display 34, a height display 36, a speed display 38, an azimuth display 40, a number of remaining bullets/missiles 42, and a damage display 44 are synthesized with an image 30 of the game space viewed from the virtual camera CM.

A radar image W3 is displayed in a given area at the lower left corner of the game screen W2. A display target display section 46 which indicates the first mission set to be the display target in the display target mission setting 536 is displayed around the radar image W3 (lower side in FIG. 22). The display target display section 46 is a button display which indicates an option which can be set by the display target mission setting 536. The current display target is highlighted differing from other button displays. In the example shown in FIG. 22, the mission A is selected.

The radar image W3 is a schematic overhead view in which the player character 6 is positioned at the center. An aircraft mark 48 indicating the player character 6 is provided at the center of the radar image W3. Axes 50 indicating the forward/backward and rightward/leftward directions are displayed to pass through the aircraft mark 48. A friend mark (outline mark in FIG. 22) indicating the friend NPC 8 positioned within a given range from the player character 6 and an enemy mark indicating the enemy NPC (black mark in FIG. 22) are displayed while maintaining the positions with respect to the player character 6.

A container display 56 which encloses the NPC (enemy NPCs 52 and 54 in the example shown in FIG. 22) which is displayed in the image 30 of the game space and is involved in the first mission set to be the display target using the display target mission setting 536 is synthesized with the game space image 30 in order to attract a player's attention to the NPC. A container display is not displayed for (synthesized with) the NPC (enemy NPC 58 in the example shown in FIG. 22) involved in the first mission other than the display target (NPCs involved in the first mission other than the display target are not displayed in the radar image in the example shown in FIG. 22).

Therefore, the battlefield viewed from the viewpoint which follows the player character 6 is displayed on the display 1222 as the main image, and the player can check the positions of the friend NPCs 8 and the enemy NPCs 9 involved in the first mission selected by the player with respect to the player character 6 using the radar image W3. Therefore, the player can selectively search for and attack the enemy NPC 9 involved in the first mission in which the player will participate even if a number of NPCs involved in the first mission fight against one another in various places in the game space. The player can check the state of another first mission by appropriately changing the radar display and the container display.

The player can change the NPCs displayed in the radar image W3 in first mission units by inputting a radar display first mission selection operation.

Figure 23:
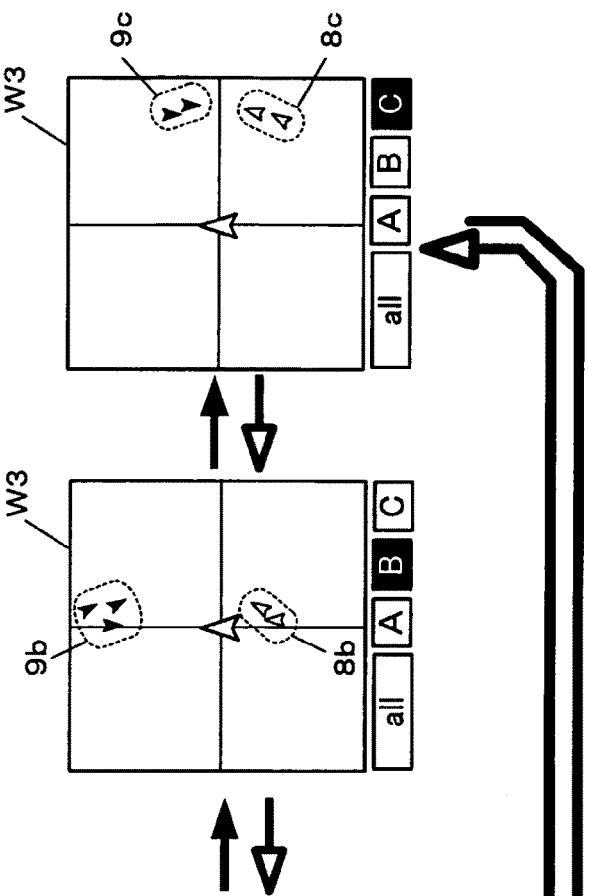
FIGS. 23A to 23D are schematic views showing a radar display change example.

FIGS. 23A to 23D are schematic views showing a radar display change example. In the display target mission setting 536 in the initial state immediately after the game has started, only the display target flag 536b corresponding to the mission type 536a "all missions" is set at "1". Therefore, the NPCs involved in all of the first missions are displayed in the first radar image W3 immediately after the game has started, as indicated by FIG. 23A, for example. Only the characters "all" corresponding to the mission type 536a "all missions" are highlighted on the display target display section 46 by inversion display, different color display, blink control, or the like. The player can determine the distribution of the friend and enemy characters over the entire battle area by observing the radar display.

When the player has pressed the right key 1234R once, the display target flag 536b in the display target mission setting 536 corresponding to the mission type 536a "all missions" is changed from "1" to "0", and the display target flag 536b corresponding to the mission type 536a "mission A" is set at "1". Only a character "A" corresponding to the mission type "mission A" is highlighted on the display target display section 46. As a result, the friend NPCs 8a and the enemy NPCs 9a involved in the mission A are displayed in the radar image W3. The NPCs involved in the missions B and C are not displayed in the radar image W3, as indicated by FIG. 23B.

When the player has pressed the right key 1234R once, the display target is changed to "mission B", and only a character "B" corresponding to the mission type "mission B" is highlighted on the display target display section 46. Therefore, the friend NPCs 8b and the enemy NPCs 9b involved in the mission B are displayed in the radar image W3, as indicated by FIG. 23C. When the player has pressed the right key 1234R once, the display target is changed to "mission C", and only a character "C" corresponding to the mission type "mission C" is highlighted on the display target display section 46. Therefore, the friend NPCs 8b and the enemy NPCs 9b involved in the mission C are displayed in the radar image W3, as indicated by FIG. 23D. When the player has pressed the right key 1234R once, the display target is returned to "all missions", and the state indicated by FIG. 23A is again displayed.

When the player has operated the left key 1234L, the display target is changed in the order of "all missions", "mission C", "mission B", and "mission A", as indicated by white arrows, differing from the case of operating the right key 1234R. When the player has further operated the left key 1234L, the display target is returned to "all missions".

Again referring to the flow shown in FIG. 15, when the game calculation section 210 has determined that the second mission performance condition has not been satisfied in the step S12 (YES in step S12), the game calculation section 210 terminates the first mission, and generates and executes the second mission to proceed with the game.

Specifically, the game calculation section 210 issues a mission update notification, and displays the information relating to the second mission (step S20). For example, the game calculation section 210 causes the characters "mission update" to blink on the game screen, and displays characters or outputs sound stating "The first mission has been completed successfully. Immediately participate in the second mission, and destroy the enemy air station.", and then displays characters or outputs sound relating the second mission.

The game calculation section 210 terminates the radar display and the container display of the enemy NPCs involved in the first mission. The game calculation section 210 then refers to the second mission setting data, and displays the enemy NPCs 9d involved in the second mission (e.g., air defense ground force, interception air force, and base facilities such as air traffic control tower and hangar; see FIG. 4). The game calculation section 210 also displays a container display on the game screen (step S22). The game calculation section 210 then executes a second mission execution process (step S24).

Figure 19:
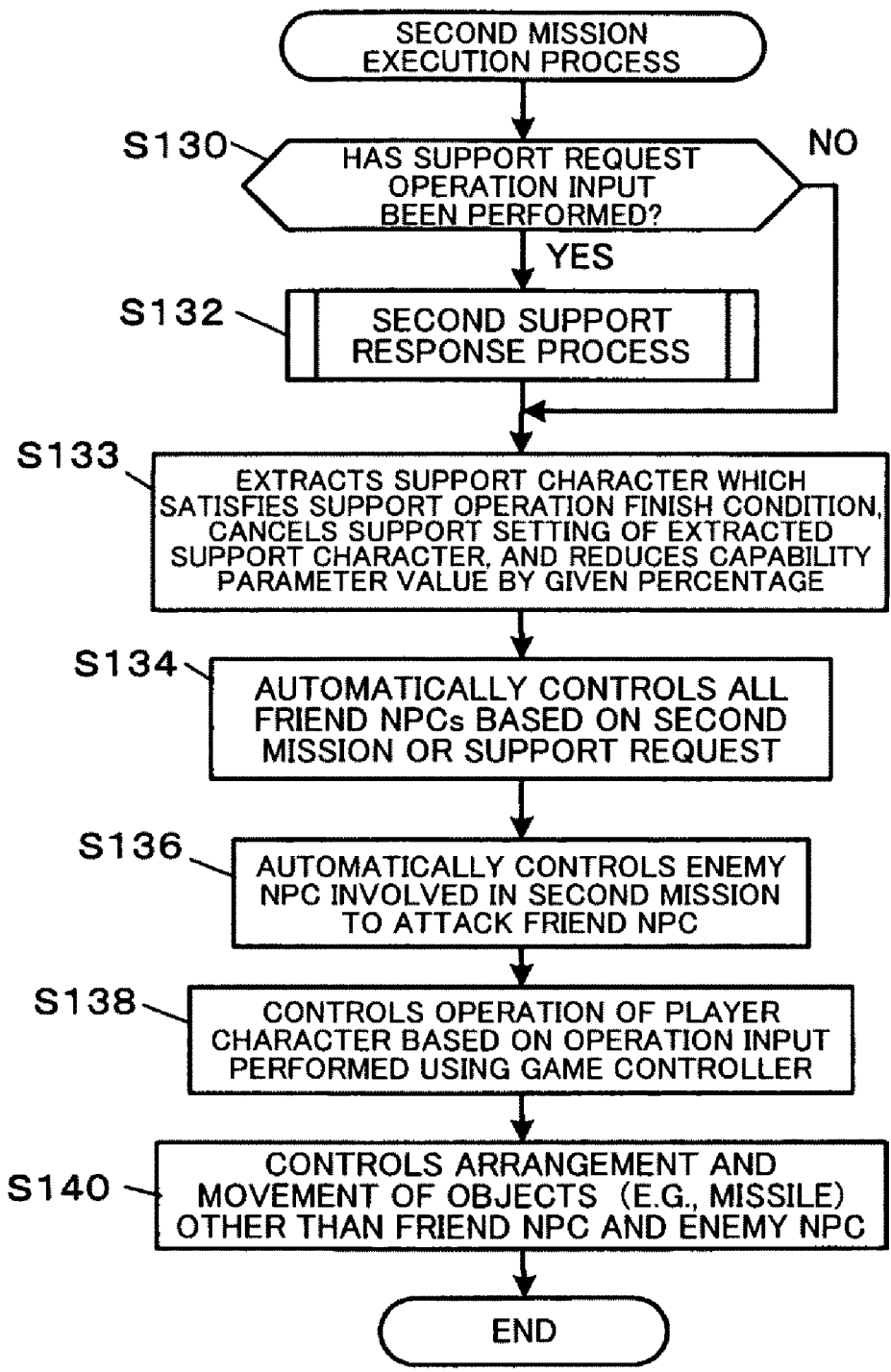
FIG. 19 is a flowchart illustrative of the flow of a second mission execution process according to the first embodiment.

FIG. 19 is a flowchart illustrative of the flow of the second mission execution process according to this embodiment. In the second mission execution process, as shown in FIG. 19, the game calculation section 210 determines whether or not a support request operation input has been performed (step S130). When the game calculation section 210 has determined that a support request operation input has been performed (YES in step S130), the game calculation section 210 executes a second support response process (step S132).

Figure 20:
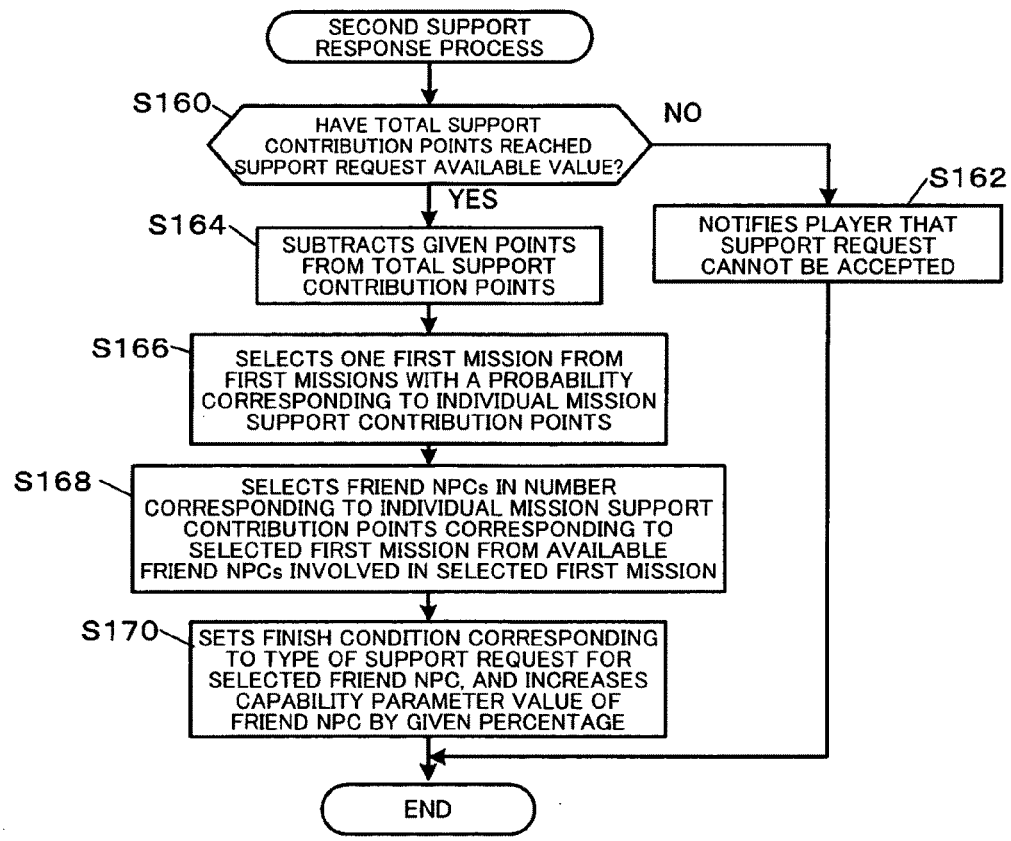
FIG. 20 is a flowchart illustrative of the flow of a second support response process according to the first embodiment.

FIG. 20 is a flowchart illustrative of the flow of the second support response process according to this embodiment. In the second support response process, as shown in FIG. 20, the game calculation section 210 determines whether or not the total support contribution points 548 have reached the support request available value required for one support request (step S160). When the game calculation section 210 has determined that the total support contribution points 548 have not reached the support request available value (NO in step S160), the game calculation section 210 notifies the player that the support request cannot be accepted (step S162).

When the game calculation section 210 has determined that the total support contribution points 548 have reached the support request available value (YES in step S160), the game calculation section 210 subtracts given points from the total support contribution points 548 (step S164).

The game calculation section 210 then selects one first mission from the first missions which have been accomplished with a probability corresponding to the individual mission support contribution points 546 corresponding to the first missions (step S166). Specifically, the game calculation section 210 selects one first mission by probability calculations based on the ratio of the respective individual mission support contribution points to the sum of the individual mission support contribution points 546, for example.

The game calculation section 210 then refers to the first mission setting data 538, and selects the friend NPCs in a number corresponding to the individual mission support contribution points 546 corresponding to the selected first mission from the available friend NPCs 8 (friend NPCs 8a and 8b in FIG. 4) involved in the selected first mission (step S168). Specifically, the game calculation section 210 selects the support character 8s. For example, the game calculation section 210 refers to the support character count calculation TBL 558, and selects the support characters in a larger number as the individual mission support contribution points are greater so that the player can receive support from the military force supported by the player to a larger extent during the first mission. Alternatively, a given number of support characters may be selected irrespective of the individual mission support contribution points.

The game calculation section 210 then sets a finish condition corresponding to the type of support request for the friend NPC selected as the support character, and increases the capability parameter value of the friend NPC by a given percentage (step S170). The game calculation section 210 thus completes the second support response process, and returns to the flow shown in FIG. 19.

The game calculation section 210 then extracts the support character which satisfies the support operation finish condition, cancels the support setting (support request type 552j) of the extracted support character, and reduces the capability parameter value by a given percentage (step S172).

The game calculation section 210 then automatically controls all of the surviving friend NPCs based on the second mission or the support request (step S134), and automatically controls the enemy NPC involved in the second mission to attack the friend NPCs (step S136).

In this embodiment, the ground force involved in the mission A is automatically controlled to advance toward the enemy air station while searching for and attacking the enemy, for example. The air force involved in the mission B is automatically controlled to search for and attack the enemy aircraft NPCs deployed around the enemy air station. The electronic force involved in the mission C flies around the enemy air station. The enemy NPCs involved in the second mission are automatically controlled to search for and attack the friend NPCs.

The game calculation section 210 controls the operation of the player character based on an operation input performed using the game controller (step S138), and controls the arrangement and the movement of objects (e.g., missiles) other than the friend NPCs and the enemy NPCs (step S140). Therefore, the NPCs fight a battle in parallel in various places in the game space in the same manner as that of the first mission.

The game calculation section 210 thus completes the second mission execution process, and returns to the flow shown in FIG. 15. The game calculation section 210 then determines the game results reflecting the results for the second mission execution process (step S26). The game calculation section 210 determines whether or not the game results satisfy the second mission finish condition (step S28). In this embodiment, the game calculation section 210 determines that the second mission finish condition is satisfied when the player character 6 has been shot down or all enemy NPCs 9d (see FIG. 2) involved in the second mission have been defeated. The game ends when the player character 6 has been shot down, and the game is cleared when all enemy NPCs 9d involved in the second mission have been defeated.

When the game calculation section 210 has determined that the second mission finish condition has not been satisfied (NO in step S28), the game calculation section 210 transitions to the step S24. When the game calculation section 210 has determined that the second mission finish condition has been satisfied (YES in step S28), the game calculation section 210 performs a game finish process such as displaying an ending screen depending on the game results (game over or game clear) (step S30), and finishes the process.

According to the above-described processes, a large-scale combat in which a number of friend NPCs 8 and enemy NPCs 9 deployed over a wide area fight in various places occurs in the game space 2. The player does not select one of the first missions executed in parallel in the early stage of the military operations. The player can seamlessly participate in an arbitrary first mission by supporting the friend NPC 8 at an arbitrary timing by operating the player character 6. Therefore, the player can enjoy a realistic game process as if the player were participating in large-scale military operations.

Moreover, the player can arbitrarily change the NPCs displayed in the radar image W3 and the NPCs displayed with a container display on the game screen W2 corresponding to each first mission. Therefore, convenience to the player can be implemented, such as preferentially searching for and attacking the enemy NPCs 9 involved in the desired first mission even if a number of NPCs are present in the game space 2.

When the player character 6 has sent a support request, the friend NPC 8 supported by the player character 6 during the first mission is controlled to immediately support the player character 6. Therefore, a realistic situation in which the characters help one another in a battlefield can be implemented, whereby game playability is significantly improved.

Hardware Configuration

A hardware configuration example according to this embodiment is described below.

Figure 24:
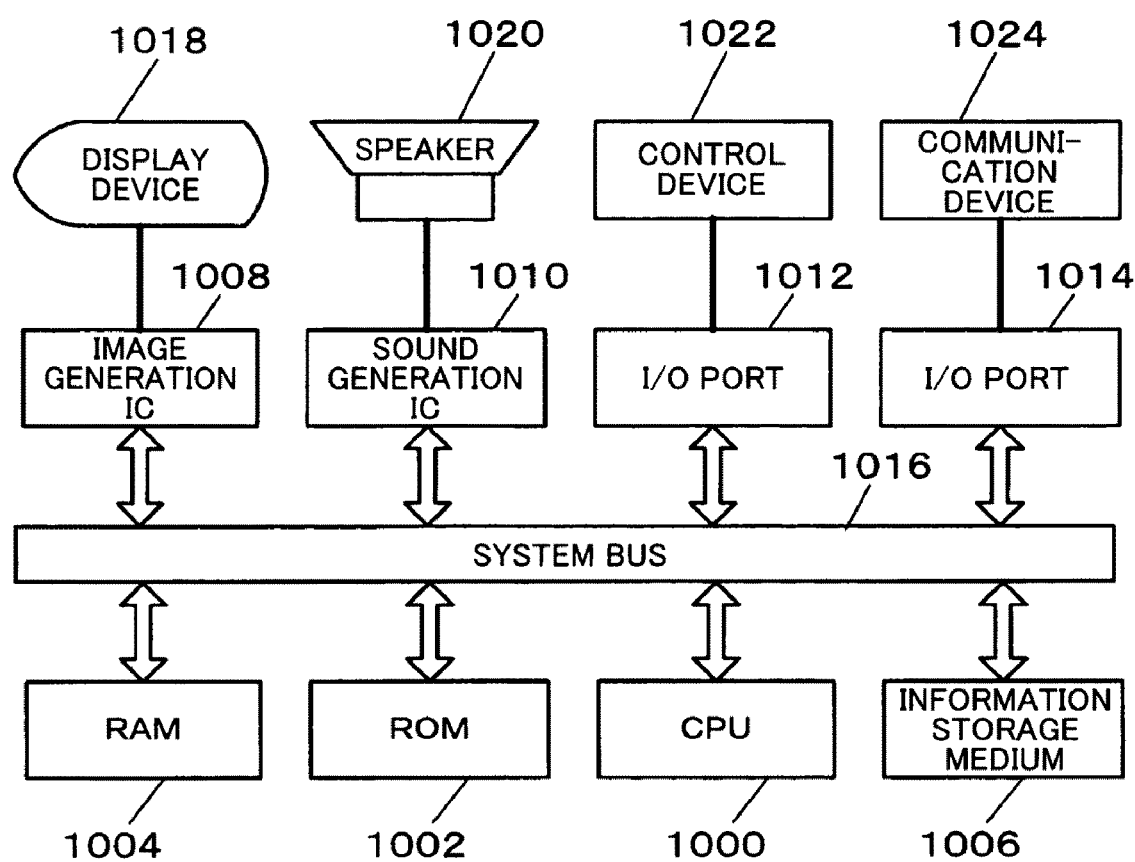
FIG. 24 is a view showing a hardware configuration example which implements a consumer game device.

FIG. 24 is a view showing a hardware configuration example which implements the consumer game device 1200 according to this embodiment. In the consumer game device 1200, a CPU 1000, a ROM 1002, a RAM 1004, an information storage medium 1006, an image generation IC 1008, a sound generation IC 1010, and I/O ports 1012 and 1014 are connected so that data can be exchanged through a system bus 1016. A control device 1022 is connected to the I/O port 1012, and a communication device 1024 is connected to the I/O port 1014.

The CPU 1000 controls the entire device and performs various types of data processing based on a program stored in the information storage medium 1006, a system program stored in the ROM 1002, a signal input from the control device 1022, and the like.

The RAM 1004 is a storage section used as a work area for the CPU 1000 and the like, and stores given information stored in the information storage medium 1006 and the ROM 1002, calculation results of the CPU 1000, and the like.

The information storage medium 1006 mainly stores a program, image data, sound data, play data, and the like. As the information storage medium, an IC memory, a hard disk, a CD-ROM, a DVD, a magnetic disk, an optical disk, or the like is used.

The ROM 1002, the RAM 1004, and the information storage medium 1006 correspond to the storage section 500 shown in FIG. 5.

The image generation IC 1008 and the sound generation IC 1010 provided in the device can suitably output sound and an image.

The image generation IC 1008 is an integrated circuit which generates pixel information according to instructions from the CPU 1000 based on information transmitted from the ROM 1002, the RAM 1004, the information storage medium 1006, and the like. An image signal generated by the image generation IC 1008 is output to a display device 1018. The display device 1018 is implemented by a CRT, an LCD, an ELD, a plasma display, a projector, or the like. The display device 1018 corresponds to the image display section 360 shown in FIG. 5.

The sound generation IC 1010 is an integrated circuit which generates a sound signal corresponding to the information stored in the information storage medium 1006 and the ROM 1002 and sound data stored in the RAM 1004 according to instructions from the CPU 1000. The sound signal generated by the sound generation IC 1010 is output from a speaker 1020. The speaker 1020 corresponds to the sound output section 350 shown in FIG. 5.

The control device 1022 is a device which allows the player to input a game operation. The function of the control device 1022 is implemented by hardware such as a lever, a button, a touch panel, a dial, and a pointing device. The control device 1022 corresponds to the operation input section 100 shown in FIG. 5.

A communication device 1024 exchanges information utilized in the device with the outside. The communication device 1024 is utilized to exchange given information with other devices. The communication device 1024 corresponds to the communication section 370 shown in FIG. 5.

The above-described processes such as the game process are implemented by the information storage medium 1006 which stores the game program 504 shown in FIG. 5 and the like, the CPU 1000, the image generation IC 1008, and the sound generation IC 1010 which operate based on the program, and the like. The CPU 1000, the image generation IC 1008, and the sound generation IC 1010 correspond to the processing section 200 shown in FIG. 5. The CPU 1000 mainly corresponds to the game calculation section 210, the image generation IC 1008 mainly corresponds to the image generation section 260, and the sound generation IC 1010 mainly corresponds to the sound generation section 250.

The processes performed by the image generation IC 1008, the sound generation IC 1010, and the like may be executed by the CPU 1000, a general-purpose DSP, or the like by means of software. In this case, the CPU 1000 corresponds to the processing section 200 shown in FIG. 5.

Second Embodiment

A second embodiment to which the invention is applied is described below. This embodiment is basically configured in the same manner as the first embodiment, except that the player can select the military force from which the support character is selected. The following description focuses on the difference from the first embodiment. The same elements as in the first embodiment are indicated by the same symbols. Description of these elements is omitted.

Figure 25:
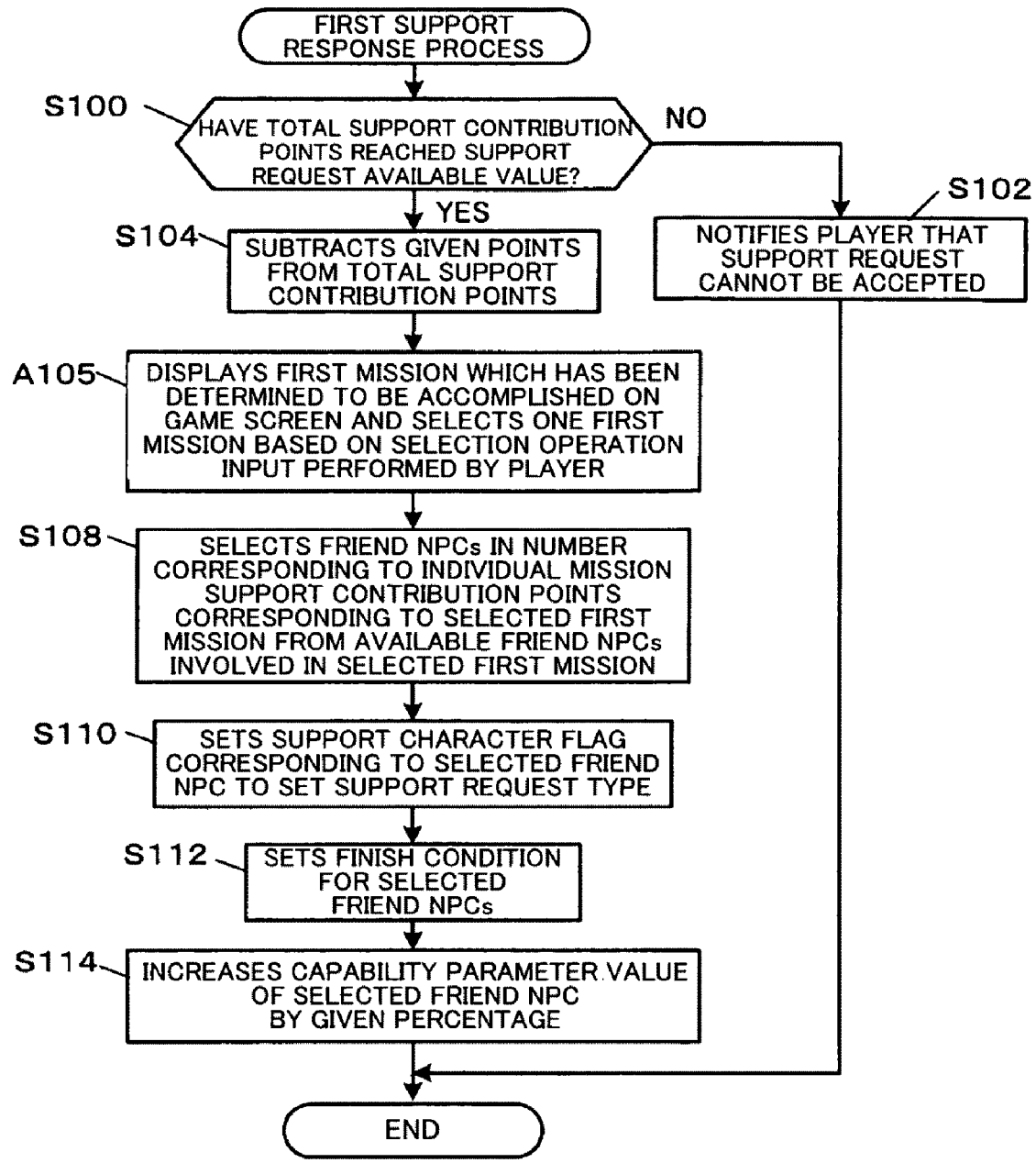
FIG. 25 is a flowchart illustrative of the flow of a first support response process according to a second embodiment.
Figure 26:
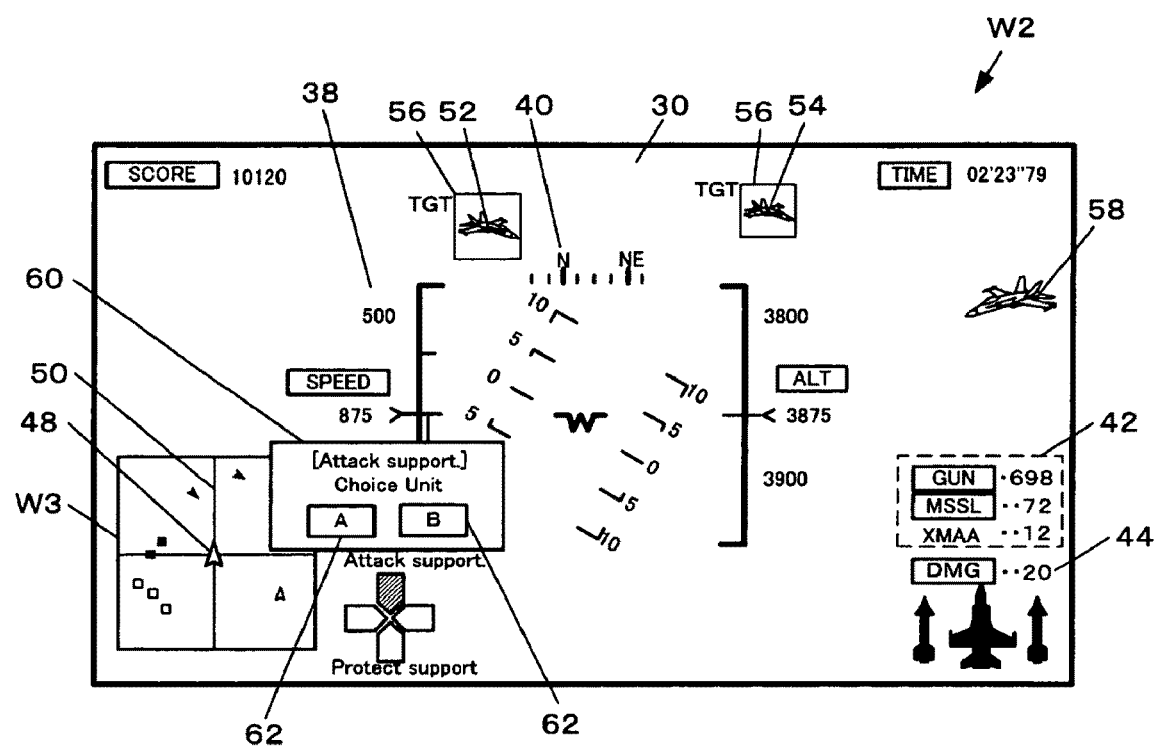
FIG. 26 is a view showing a game screen example during a second mission according to the second embodiment.

FIG. 25 is a flowchart illustrative of the flow of a first support response process according to this embodiment. As shown in FIG. 26, the first support response process according to this embodiment is basically the same as the first support response process according to the first embodiment, except that a step A105 is performed instead of the step S106 according to the first embodiment.

In the step A105, the image generation section 260 of the processing section 200 displays the first mission which has been determined to be accomplished on the game screen as an option referring to the success mission flag 550. A first mission is selected based on a selection operation input performed by the player. A support character is selected from the friend NPCs involved in the selected first mission.

In a second support response process according to this embodiment, a process similar to the step A105 is performed instead of the step S166 (see FIG. 20).

The step S166 of the second support response process is replaced by a process similar to the step A105 (not shown).

FIG. 26 is a view showing a game screen example in which the second mission is performed in this embodiment. FIG. 26 shows a state in which a support request has been input and a first mission selection display for selecting a support character has been performed. As shown in FIG. 26, the type of support request ([Attack support]) currently selected and available mission identifiers 62 are displayed on a selection display 60. In the example shown in FIG. 26, the missions A and B can be selected. For example, the player selects the mission A or B by operating the right key 1234R or the left key 1234L, and determines the selection by performing an attack support request operation input (up key 1234U).

According to this embodiment, the player can selectively send a support request to the friend NPCs 8 involved in the desired first mission. Specifically, when the player desires that the support character attack a fighter aircraft enemy NPC 9 and can select the support character from the ground force and the air force, the player can be more effectively supported by selecting the air force, for example. Therefore, game playability can be improved by incorporating a strategic factor relating to the support request.

Modification

The first and second embodiments to which the invention is applied have been described above. Note that the invention is not limited to the above-described embodiments.

The above-described embodiments illustrate an example in which a video game is executed using the consumer game device 1200. Note that the above-described game may also be executed using an arcade game device, a personal computer, a portable game device, and the like. The above-described game need not necessarily executed using a stand-alone game device. Specifically, the above-described game may be a network game (online game).

The first embodiment has been described taking an example in which the support character is selected from the characters involved in the first mission which has been accomplished. Note that the support character may also be selected from the first mission for which the mission accomplishment condition has not been satisfied in the step S106 (first support response process) and the step S166 (second support response process) provided that the individual mission support contribution points 546 are equal to or larger than a reference value (e.g., 100 pt).

In the above-described embodiments, the number of support characters to be selected changes corresponding to the individual mission support contribution points 546. Note that the invention is not limited thereto. For example, instead of the support character count calculation TBL 558, a TBL is provided and referred to in which a friend NPC 8 with a high durability value (corresponding to hit point) is selected as the individual mission support contribution points 546 increase, and a friend NPC 8 with a low durability value is selected as the individual mission support contribution points 546 decrease, without changing the number of support characters. In this case, a situation occurs in which the support character is easily shot down by the enemy when the individual mission support contribution points 546 are small. Therefore, the results for the first mission can be reflected in the game.

The above-described embodiments have been given taking a game in which one military operation is performed. Note that a plurality of military operations may be set and sequentially performed based on the story.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A calculation control method that causes a computer to execute a given video game by creating a virtual game space and controlling a character in the virtual game space, the method comprising:

disposing a plurality of non-player characters (hereinafter referred to as "NPCs") in respective battle areas in the game space, and causing the plurality of NPCs to fight a battle in parallel in the respective battle areas, the plurality of NPCs being classified into a friend NPC that fights with a player character (hereinafter referred to as "PC") and an enemy NPC that fights against the PC;

determining whether or not the PC has participated in the battle in the respective battle areas based on at least a present position of the PC;

detecting whether or not the player has performed a support request operation input;

performing a given support process, the given support process being a control process that causes a friend NPC involved in a battle area where the PC has been determined to participate in the battle to approach the present position of the PC and support the PC when detecting that the player has performed the support request operation input; and generating an image of the game space and controlling display of the generated image, wherein at least one of the above steps is performed by a processor of the computer.

2. The calculation control method as defined in claim 1, the calculation control method further including:

determining whether or not the battle has been completed in the respective battle areas; and performing the support process for a friend NPC involved in a battle area where the PC has been determined to participate in the battle and the battle has been determined to have been completed.

3. The calculation control method as defined in claim 1, the calculation control method further including: managing attack results for the PC corresponding to each battle area where the PC has been determined to participate in the battle; and selecting a friend NPC as a target of the support process based on the attack results corresponding to each battle area.

4. The calculation control method as defined in claim 3, the calculation control method further including selecting a battle area from the battle areas based on the attack results corresponding to the respective battle area, and selecting a friend NPC involved in the selected battle area as the target of the support process.

5. The calculation control method as defined in claim 4, the calculation control method further including selecting a friend NPC as the target of the support process from friend NPCs involved in the selected battle area based on the attack results corresponding to the selected battle area.

6. The calculation control method as defined in claim 4, the calculation control method further including:

terminating the support process when a given execution time has elapsed after the support process has been performed; and changing the control execution time based on the attack results corresponding to the selected battle area.

7. The calculation control method as defined in claim 3, the calculation control method further including:

calculating and managing evaluation points determined by evaluating the attack results for the PC corresponding to each battle area using a given evaluation method as overall attack results for the PC corresponding to the battle areas;

subtracting given evaluation points from the evaluation points each time the support request operation input is detected; and when the support request operation input has been detected, omitting the support process when the evaluation points are less than the given evaluation points, and performing the support process when the evaluation points are equal to or greater than the given evaluation points.

8. The calculation control method as defined in claim 7, the calculation control method further including:

determining whether or not the battle has succeeded in the respective battle areas; and adding given bonus points to the evaluation points corresponding to each battle area where the PC has been determined to participate in the battle and the battle has been determined to have succeeded.

9. The calculation control method as defined in claim 3, the calculation control method further including changing a given capability parameter value set corresponding to the selected friend NPC.

10. The calculation control method as defined in claim 9, the calculation control method further including increasing the capability parameter value relating to a moving speed.

11. The calculation control method as defined in claim 1, the calculation control method further including selecting a battle area from the battle areas based on a selection operation performed by the player, and selecting a friend NPC involved in the selected battle area as a target of the support process.

12. The calculation control method as defined in claim 11, the calculation control method further including: selecting a friend NPC as the target of the support process from friend NPCs involved in the selected battle area based on the attack results corresponding to the selected battle area.

13. The calculation control method as defined in claim 11, the calculation control method further including:

terminating the support process when a given execution time has elapsed after the support process has been performed; and changing the control execution time based on the attack results corresponding to the selected battle area.

14. The calculation control method as defined in claim 1, the calculation control method further including:

detecting a type of support request input by the support request operation input; and performing the support process while changing an attack target of the friend NPC as a target of the support process based on the type of the support request that has been detected.

15. The calculation control method as defined in claim 1, the calculation control method further including:

selecting one or all of the battles corresponding to the respective battle areas executed in parallel; and displaying relative positions of a friend NPC and a enemy NPC involved in the selected battle with respect to the PC by means of a radar display.

16. The calculation control method as defined in claim 1, the calculation control method further including:

generating a game image of the game space viewed from the PC;

selecting one or all of the battles corresponding to the respective battle areas executed in parallel; and detecting a friend NPC and a enemy NPC involved in the selected battle from the plurality of NPCs included in the game image, and displaying a given identifier corresponding to the friend NPC and the enemy NPC detected in the game image.

17. The calculation control method as defined in claim 1, the game being a mission clear-type game; and the calculation control method further including displaying a mission of the game for the player at a given timing after the battles have been executed.

18. A non-transitory computer-readable storage, medium storing a program that causes a computer to execute a given video game by creating a virtual game space and controlling a character in the virtual game space, the program causing the computer to:

dispose a plurality of non-player characters (hereinafter referred to as "NPCs") in respective battle areas in the game space, and cause the plurality of NPCs to fight a battle in parallel in the respective battle areas, the plurality of NPCs being classified into a friend NPC that fights with a player character (hereinafter referred to as "PC") and an enemy NPC that fights against the PC;

determine whether or not the PC has participated in the battle in the respective battle areas based on at least a present position of the PC;

detect whether or not the player has performed a support request operation input;

perform a given support process, the given support process being a control process that causes a friend NPC involved in a battle area where the PC has been determined to participate in the battle to approach the present position of the PC and support the PC when detecting that the player has performed the support request operation input; and generate an image of the game space and controlling display of the generated image.

19. A game device that executes a given video game by creating a virtual game space and controlling a character in the virtual game space, the game device comprising:

a battle parallel execution section that disposes a plurality of NPCs in respective battle areas in the game space, and causes the plurality of NPCs to fight a battle in parallel in the respective battle areas, the plurality of NPCs being classified into a friend NPC that fights with a PC and an enemy NPC that fights against the PC;

a battle participation determination section that determines whether or not the PC has participated in a battle in plurality respective battle areas based on at least a present position of the PC;

a support request detection section that detects whether or not the player has performed a support request operation input; and a support process control section that performs a given support process, the given support process being a control process that causes a friend NPC in a battle area where the battle participation determination section has determined that the PC has participated in the battle to approach the present position of the PC and support the PC when the support request detection section has detected that the player has performed the support request operation input.

* * * * *